US009435106B2

(12) United States Patent
Fukano et al.

(10) Patent No.: US 9,435,106 B2
(45) Date of Patent: Sep. 6, 2016

(54) DISPLAY SYSTEM IN AN EXCAVATOR AND METHOD FOR CONTROLLING SAME

(75) Inventors: Ryo Fukano, Yokohama (JP); Azumi Nomura, Fujisawa (JP); Takashi Kurihara, Hirakata (JP); Etsuo Fujita, Hirakata (JP); Masao Ando, Komatsu (JP); Toshihiro Koide, Chiba (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 13/819,260

(22) PCT Filed: Feb. 8, 2012

(86) PCT No.: PCT/JP2012/052834
§ 371 (c)(1),
(2), (4) Date: Feb. 26, 2013

(87) PCT Pub. No.: WO2012/114873
PCT Pub. Date: Aug. 30, 2012

(65) Prior Publication Data
US 2013/0158786 A1      Jun. 20, 2013

(30) Foreign Application Priority Data
Feb. 22, 2011  (JP) ................................ 2011-036201

(51) Int. Cl.
*E02F 3/43*  (2006.01)
*E02F 3/30*  (2006.01)
(Continued)

(52) U.S. Cl.
CPC ................. *E02F 9/26* (2013.01); *E02F 9/264* (2013.01); *G01C 21/00* (2013.01)

(58) Field of Classification Search
CPC ............ E02F 9/26; E02F 9/264; G01C 21/00
USPC ....... 701/34.4, 50, 29.1, 1, 104, 2, 32.3, 33.7
See application file for complete search history.

(56) References Cited

U.S. PATENT DOCUMENTS 5,631,658 A * 5/1997 Gudat et al. .................. 342/457
6,114,993 A * 9/2000 Henderson et al. ..... 342/357.27
(Continued)

FOREIGN PATENT DOCUMENTS

JP         2001-98585 A      4/2001
JP         2001-123476 A     5/2001
(Continued)

OTHER PUBLICATIONS

International Search Report of corresponding PCT Application No. PCT/JP2012/052834.

*Primary Examiner* — Mussa A Shaawat
*Assistant Examiner* — Abdhesh Jha
(74) *Attorney, Agent, or Firm* — Global IP Counselors, LLP

(57) ABSTRACT

In a display system in an excavator, a position of an upper boundary line and a position of a lower boundary line are calculated. The upper boundary line indicates a height of a top of a cross section of a display object surface. The lower boundary line indicates a height of a bottom of the cross section of the display object surface. When the current position of the excavator is between the upper boundary line and the lower boundary line, a predetermined reference point of a display range is set to a predetermined position between the upper and lower boundary lines. When the current position of the excavator is above the upper boundary line, the reference point is set above the predetermined position. When the current position of the excavator is below the lower boundary line, the reference point is set below the predetermined position.

7 Claims, 26 Drawing Sheets

(51) Int. Cl.
*E02F 9/26* (2006.01)
*G01C 21/00* (2006.01)

(56) References Cited

U.S. PATENT DOCUMENTS

| | | | | |
|---|---|---|---|---|
| 6,282,477 | B1* | 8/2001 | Gudat et al. | 701/50 |
| 6,655,465 | B2* | 12/2003 | Carlson et al. | 172/4.5 |
| 7,532,967 | B2* | 5/2009 | Fujishima et al. | 701/50 |
| 8,498,806 | B2* | 7/2013 | Fukano et al. | 701/408 |
| 2007/0010925 | A1* | 1/2007 | Yokoyama et al. | 701/50 |
| 2008/0133128 | A1* | 6/2008 | Koch | 701/207 |
| 2008/0180523 | A1* | 7/2008 | Stratton et al. | 348/114 |
| 2013/0158784 | A1* | 6/2013 | Fukano et al. | 701/34.4 |
| 2013/0158785 | A1* | 6/2013 | Fukano et al. | 701/34.4 |
| 2013/0158797 | A1* | 6/2013 | Fukano et al. | 701/36 |

FOREIGN PATENT DOCUMENTS

| | | |
|---|---|---|
| JP | 2004-68433 A | 3/2004 |
| JP | 2006-214246 A | 8/2006 |
| WO | 2004/027164 A1 | 4/2004 |

* cited by examiner (a) 
SHORT SIDE (b)

| MODE | SHORT SIDE LENGTH |
|---|---|
| TRAVEL MODE | Lmax × 2 |
| ROUGH DIGGING PICTURE | Lmax × 1.5 |
| FINE DIGGING PICTURE | Lmax × 1.2 | ns
DISPLAY SYSTEM IN AN EXCAVATOR AND METHOD FOR CONTROLLING SAME

CROSS-REFERENCE TO RELATED APPLICATIONS

This application claims priority to Japanese Patent Application No. 2011-036201 filed on Feb. 22, 2011, the disclosure of which is hereby incorporated herein by reference in its entirety.

TECHNICAL FIELD

The present invention relates to a display system in an excavator and a method for controlling same.

BACKGROUND ART

A display system for displaying a guidance picture displaying the positional relationship of a target surface and an excavator such as a hydraulic shovel is known. The target surface is a plane selected as a work object from a plurality of design surfaces constituting a design land shape. For example, in the display system disclosed in Japanese Laid-open Patent Application Publication 2001-123476, the relative positional relationship of a bucket and a target surface is calculated based on detection data such as the position and orientation of a bucket of a hydraulic shovel, and the position, gradient, and the like of the target surface. The display system then displays on a monitor a schematic diagram of the bucket and the target surface as seen from the side. At this time, the display system changes the display scale of the image according to the distance between the target surface and the tip of the bucket. Japanese Laid-open Patent Application Publication 2001-123476 also discloses that it is also acceptable to fix the scale of the image to the extent that all of the body and the work machine of the hydraulic shovel and the target surface are included in the same image and display the image on the monitor.

SUMMARY

When the display scale of the image is changed according to the distance between the target surface and the work machine, as in the display system disclosed in patent document 1, the target surface and the work machine can be displayed at an excessively small size, making it difficult to ascertain the positional relationship of the target surface and the work machine. When the target surface and the work machine are positioned far apart in cases that the scale of the image is fixed to the extent that all of the excavator and the target surface are included in the same image and the image is displayed on the monitor, the target surface and the excavator are displayed at an excessively small size. It is therefore difficult to ascertain the positional relationship between the target surface and the excavator.

An object of the present invention is to provide a display system in an excavator and method for controlling the same allowing the positional relationship between an excavator and a display object surface displayed in a guidance picture to be easily ascertained.

A display system in an excavator according to a first aspect of the present invention is a system for displaying a guidance picture. The guidance picture shows a current position of the excavator and a cross section of a display object surface indicating part of a target land shape of an object of excavation as seen from the side. The excavator display system comprises a storage unit, a position detector unit, a calculation unit, and a display unit. The storage unit stores land shape data indicating the position of the display object surface. The position detector unit detects the current position of the excavator. The calculation unit sets a predetermined display range displayed as a guidance picture for the land shape data. The calculation unit calculates the position of an upper boundary line and the position of a lower boundary line based on the land shape data and the current position of the excavator. The upper boundary line indicates the height of the top of the cross section of the display object surface. The lower boundary line indicates the height of the bottom of the cross section of the display object surface. When the current position of the excavator is between the upper boundary line and the lower boundary line, the calculation unit sets a predetermined reference point of the display range at a predetermined position between the upper boundary line and the lower boundary line. When the current position of the excavator is above the upper boundary line, the calculation unit sets the reference point above the predetermined position. When the current position of the excavator is below the lower boundary line, the calculation unit sets the reference point below the predetermined position. The display unit displays a guidance picture showing a cross section of the display object surface included in the display range as seen from the side and the current position of the excavator.

A display system in an excavator according to a second aspect of the present invention is the display system in the excavator according to the first aspect; wherein, when the current position of the excavator is above the upper boundary line, the calculation unit sets the reference point of the display range to a position higher than the predetermined position by the distance between the current position of the excavator and the upper boundary line. When the current position of the excavator is below the lower boundary line, the calculation unit sets the reference point of the display range to a position lower than the predetermined position by the distance between the current position of the excavator and the lower boundary line.

An excavator according to a third aspect of the present invention comprises the display system in the excavator according to the first or second aspect.

A method for controlling a display system in an excavator according to a fourth aspect of the present invention is a method for controlling a display system for displaying a guidance picture. The guidance picture shows a current position of the excavator and a cross section of a display object surface indicating part of a target land shape of an object of excavation as seen from the side. The control method comprises the following steps. In the first step, the current position of the excavator is detected. In the second step, the predetermined display range displaying the guidance picture is set for the land shape data indicating the position of the display object surface. In the third step, the position of an upper boundary line and the position of a lower boundary line are calculated based on the land shape data and the current position of the excavator. The upper boundary line indicates the height of a top of the cross section of the display object surface as seen from the side. The lower boundary line indicates the height of a bottom of the cross section of the display object surface as seen from the side. In the fourth step, when the current position of the excavator is between the upper boundary line and the lower boundary line, a predetermined reference point of the display range is set to a predetermined position between the upper boundary line and the lower boundary line. In the fifth step, when the current position of the excavator is above the upper boundary line, the reference point is set above the predetermined position. In the sixth step, when the current position of the excavator is below the lower boundary line, the reference point is set below the predetermined position. In the seventh step, the guidance picture showing a cross section of the display object surface included in the display range as seen from the side and the current position of the excavator is displayed.

In the display system in the excavator according to the first aspect of the present invention, the reference point of the display range of the guidance picture is fixed at the predetermined position between the upper boundary line and the lower boundary line when the current position of the excavator is between the upper boundary line and the lower boundary line. Thus, the excavator is displayed moving tip or down without the cross section of the display object surface moving in the guidance picture when the excavator moves up or down between the upper boundary line and the lower boundary line. When the excavator moves above the upper boundary line, the reference point of the display range is changed to a position above the predetermined position. The cross section of the display object surface thereby moves downward in the guidance picture, and the display range is displayed moving upward after the excavator. When the excavator moves below the lower boundary line, the reference point of the display range is changed to a position below the predetermined position. The cross section of the display object surface thereby moves upward in the guidance picture, and the display range is displayed moving downward after the excavator. This prevents the target surface and the excavator from being displayed excessively small. An operator can therefore easily ascertain the positional relationship of the target surface and the excavator.

In the display system in the excavator according to the second aspect of the present invention, the reference point of the display range is changed to a position above the predetermined position according to the distance by which the current position of the excavator is higher than the upper boundary line. The reference point of the display range is changed to a position below the predetermined position according to the distance by which the current position of the excavator is lower than the lower boundary line. This enables the guidance picture to be scrolled smoothly.

In the excavator according to the hi rd aspect of the present invention, the reference point of the display range of the guidance picture is fixed at the predetermined position between the upper boundary line and the lower boundary line when the current position of the excavator is between the upper boundary line and the lower boundary line. Thus, the excavator is displayed moving up or down without the cross section of the display object surface moving in the guidance picture when the excavator moves up or down between the upper boundary line and the lower boundary line. When the excavator proves above the upper boundary lure, the reference point of the display range is changed to a position above the predetermined position. The cross section of the display object surface thereby moves downward in the guidance picture, and the display range is displayed moving upward after the excavator. When the excavator moves below the lower boundary line, the reference point of the display range is changed to a position below the predetermined position. The cross section of the display object surface thereby moves upward in the guidance picture, and the display range is displayed moving downward after the excavator. This prevents the target surface and the excavator from being displayed excessively small. An operator can therefore easily ascertain the positional relationship of the target surface and the excavator.

In the method for controlling a display system in an excavator according to the fourth aspect of the present invention, the reference point of the display range of the guidance picture is fixed at the predetermined position between the upper boundary line and the lower boundary line when the current position of the excavator or is between the upper boundary line and the lower boundary line. Thus, the excavator is displayed moving up or down without the cross section of the display object surface moving in the guidance picture when the excavator moves up or down between the upper boundary line and the lower boundary line. When the excavator or moves above the upper boundary line, the reference point of the display range is changed to a position above the predetermined position. The cross section of the display object surface thereby moves downward in the guidance picture, and the display range is displayed moving upward after the excavator. When the excavator moves below the lower boundary line, the reference point of the display range is changed to a position below the predetermined position. The cross section of the display object surface thereby moves upward in the guidance picture, and the display range is displayed moving downward after the excavator. This prevents the target surface and the excavator from being displayed excessively small. An operator can therefore easily ascertain the positional relationship of the target surface and the excavator.

DETAILED DESCRIPTION OF EMBODIMENTS

1. Configuration

1-1. Overall Configuration of Hydraulic Shovel

Figure 1:
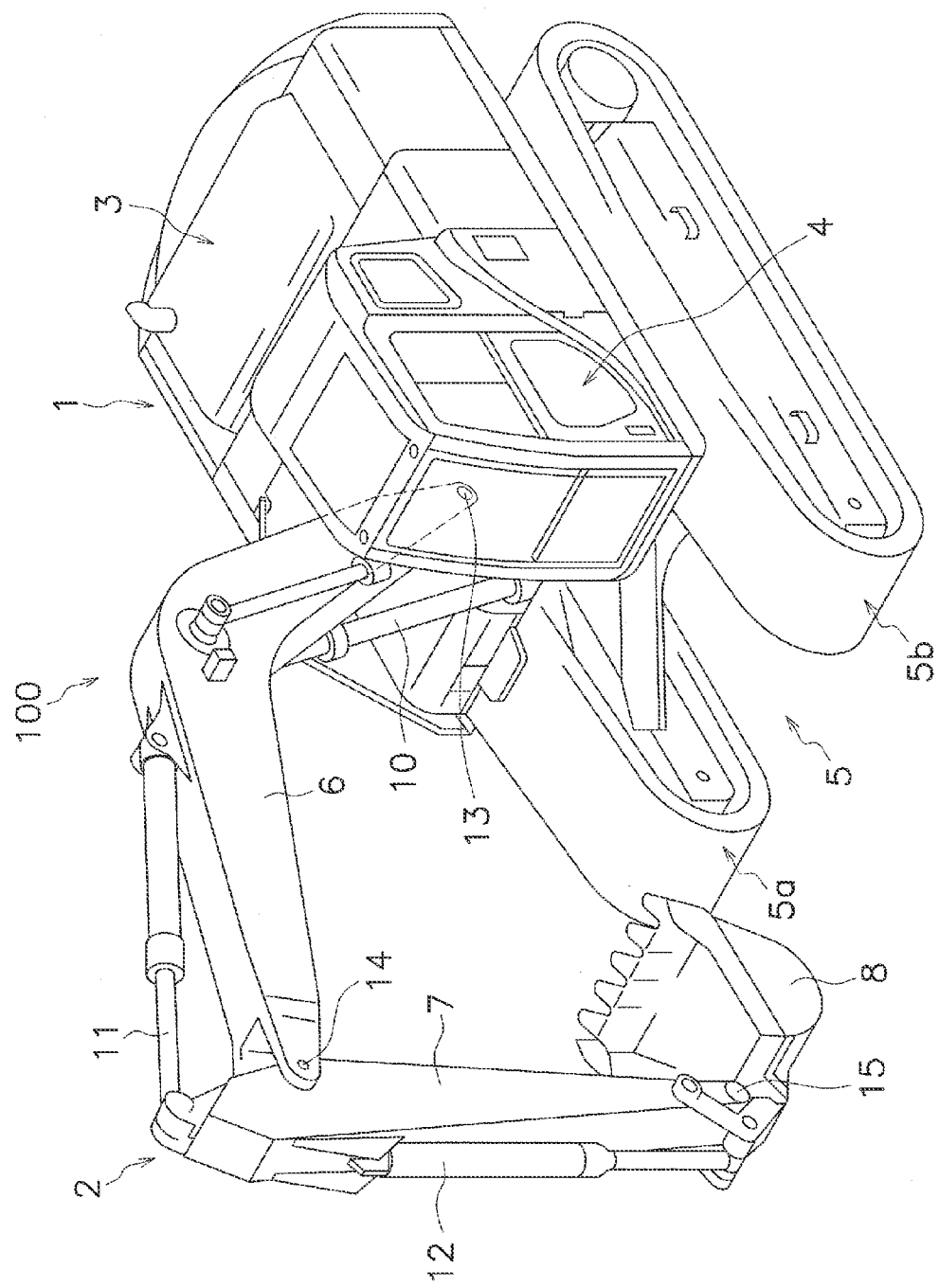
FIG. 1 is a perspective view of a hydraulic shovel.

There follows a description of a display system in an excavator according to an embodiment of the present invention with reference to the drawings. FIG. 1 is a perspective view of a hydraulic shovel 100 as an example of an excavator in which a display system is installed. The hydraulic shovel 100 has a main vehicle body 1 and a work machine 2. The main vehicle body 1 has an upper pivoting body 3, a cab 4, and a travel unit 5. The upper pivoting body 3 includes devices such as an engine, a hydraulic pump, and/or the like, which are not shown in the drawings. The cab 4 is installed on the front of the upper pivoting body 3. A display input device 38 and an operating device 25 described below are disposed within the cab 4 (cf. FIG. 3). The travel unit 5 has tracks 5a, 5b, and the rotation of the tracks 5a, 5b causes the hydraulic shovel 100 to travel.

The work machine 2 is attached to the front of the main vehicle body 1, and has a boom 6, an arm 7, a bucket 8, a boom cylinder 10, an arm cylinder 11, and a bucket cylinder 12. The base end of the boom 6 is pivotally attached to the front of the main vehicle body 1 with a boom pin 13 disposed therebetween. The base end of the arm 7 is pivotally attached to the tip end of the boom 6 with an arm pin 14 disposed therebetween. The tip end of the arm 7 is pivotally attached to the bucket 8 with a bucket pin 15 disposed therebetween.

Figure 2:
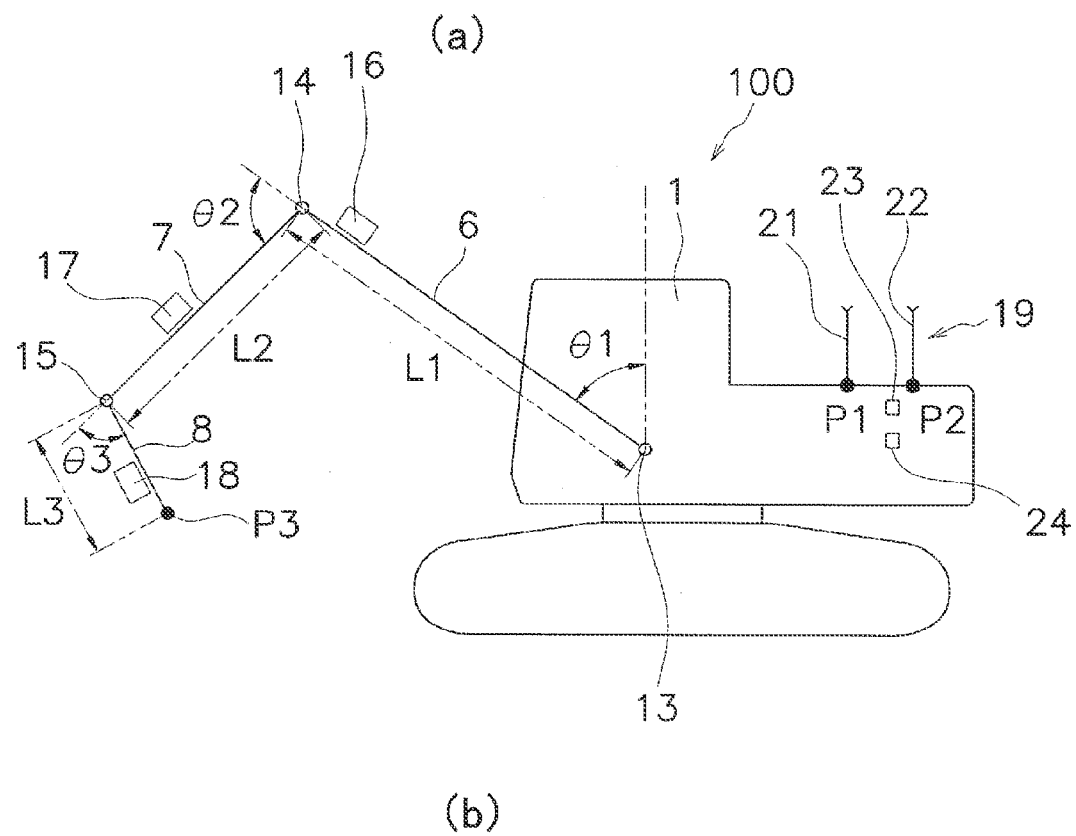
FIG. 2 is a schematic illustration of the configuration of the hydraulic shovel.

FIG. 2 is a schematic illustration of the configuration of the hydraulic shovel 100. FIG. 2(a) is a side view of the hydraulic shovel 100, and FIG. 2(b) is a rear view of the hydraulic shovel 100. As shown in FIG. 2(a), L1 is the length of the boom 6, i.e., the length from the boom pin 13 to the arm pin 14. L2 is the length of the arm 7, i.e., the length from the arm pin 14 to the bucket pin 15. L3 is the length of the bucket 8, i.e., the length from the bucket pin 15 to the tip of a tooth of the bucket 8.

The boom cylinder 10, arm cylinder 11, and bucket cylinder 12 shown in FIG. 1 are hydraulic cylinders, each of which is driven by hydraulic pressure. The boom cylinder 10 drives the boom 6. The arm cylinder 11 drives the arm 7. The bucket cylinder 12 drives the bucket 8. A proportional control valve 37 (cf. FIG. 3) is disposed between a hydraulic pump not shown in the drawings and the hydraulic cylinders, such as the boom cylinder 10, arm cylinder 11, bucket cylinder 12, and the like. The proportional control valve 37 is controlled by a work machine controller 26 described below, whereby the flow rate of hydraulic oil supplied to the hydraulic cylinders 10 to 12 is controlled. In this way, the movements of the hydraulic cylinders 10 to 12 are controlled.

As shown in FIG. 2(a), the boom 6, arm 7, and bucket 8 are provided with first through third stroke sensors 16 to 18, respectively. The first stroke sensor 16 detects the stroke length of the boom cylinder 10. A display controller 39 (cf. FIG. 3) described below calculates an angle of inclination $\theta1$ of the boom 6 with respect to an axis Za (cf. FIG. 6) of a main vehicle body coordinate system described below using the stroke length of the boom cylinder 10 detected by the first stroke sensor 16. The second stroke sensor 17 detects the stroke length of the arm cylinder 11. The display controller 39 calculates an angle of inclination $\theta2$ of the arm 7 with respect to the boom 6 using the stroke length of the arm cylinder 11 detected by the second stroke sensor 17. The third stroke sensor 18 detects the stroke length of the bucket cylinder 12. The display controller 39 calculates an angle of inclination $\theta3$ of the bucket 8 with respect to the arm 7 using the stroke length of the bucket cylinder 12 detected by the third stroke sensor 18.

The main vehicle body 1 is provided with a position detector unit 19. The position detector unit 19 detects the current position of the hydraulic shovel 100. The position detector unit 19 has two Real Time Kinematic Global Navigation Satellite System (RTK-GNSS) antennas 21, 22 (hereafter, "GNSS antennas 21, 22"), a three-dimensional position sensor 23, and an inclination angle sensor 24. The GNSS antennas 21, 22 are disposed at a fixed interval along a Ya axis (cf. FIG. 6) of a main vehicle body coordinate system Xa-Ya-Za described below. Signals corresponding to GNSS radio waves received by the GNSS antennas 21, 22 are inputted to the three-dimensional position sensor 23. The three-dimensional position sensor 23 detects mounting positions P1, P2 of the GNSS antennas 21, 22. As shown in FIG. 2(b), the inclination angle sensor 24 detects an angle of inclination $\theta4$ (hereafter, "roll angle $\theta4$") of the widthwise direction of the main vehicle body 1 with respect to the direction of gravity (a vertical line).

Figure 3:
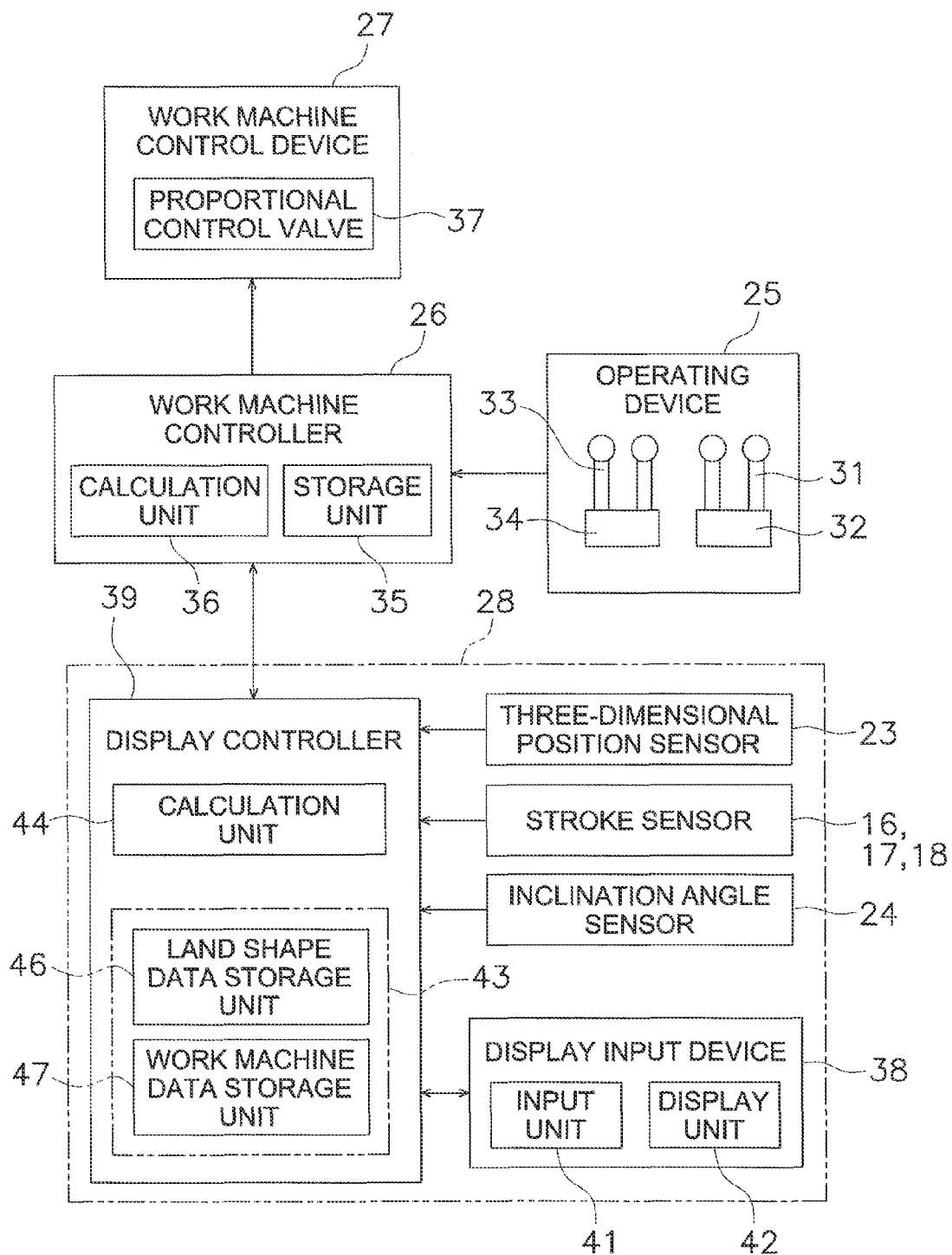
FIG. 3 is a block diagram showing the configuration of a control system which a hydraulic shovel comprises.

FIG. 3 is a block diagram of the configuration of a control system which the hydraulic shovel 100 comprises. The hydraulic shovel 100 comprises the operating device 25, the work machine controller 26, a work machine control device 27, and a display system 28. The operating device 25 has a work machine operating member 31, a work machine operation detector unit 32, a travel operating member 33, and a travel operation detector unit 34. The work machine operating member 31 is a member for allowing an operator to operate the work machine 2, and is, for example, an operating lever. The work machine operation detector unit 32 detects the details of the operation inputted by using the work machine operating member 31, and sends the details to the work machine controller 26 as a detection signal. The travel operating member 33 is a member for allowing an operator to operate the traveling of the hydraulic shovel 100, and is, for example, an operating lever. The travel operation detector unit 34 detects the details of the operation inputted by using the travel operating member 33, and sends the details to the work machine controller 26 as a detection signal.

The work machine controller 26 has a storage unit 35 such as RAM or ROM, and a calculation unit 36 such as a CPU. The work machine controller 26 primarily controls the work machine 2. The work machine controller 26 generates a control signal for causing the work machine 2 to act according to the operation of the work machine operating member 31, and outputs the signal to the work machine control device 27. The work machine control device 27 has the proportional control valve 37, and the proportional control valve 37 is controlled based on the control signal from the work machine controller 26. Hydraulic oil is drained from the proportional control valve 37 at a flow rate corresponding to the control signal from the work machine controller 26, and is supplied to the hydraulic cylinders 10 to 12. The hydraulic cylinders 10 to 12 are driven according to the hydraulic oil supplied from the proportional control valve 37. This causes the work machine 2 to act.

1-2. Configuration of Display System 28

The display system 28 is a system for displaying a guidance picture showing the relationship between the target surface of the work area and the current position of the hydraulic shovel 100. The display system 28 has the display input device 38 and the display controller 39 along with the first through third stroke sensors 16 to 18, the three-dimensional position sensor 23, and the inclination angle sensor 24 described above.

The display input device 38 has an input unit 41 like a touch panel, and a display unit 42 such as an LCD. The display input device 38 displays the guidance picture. Various keys are shown in the guidance picture. An operator can execute various functions of the display system 28 by touching the various keys in the instruction picture. The instruction picture will be described in detail later.

Figure 4:
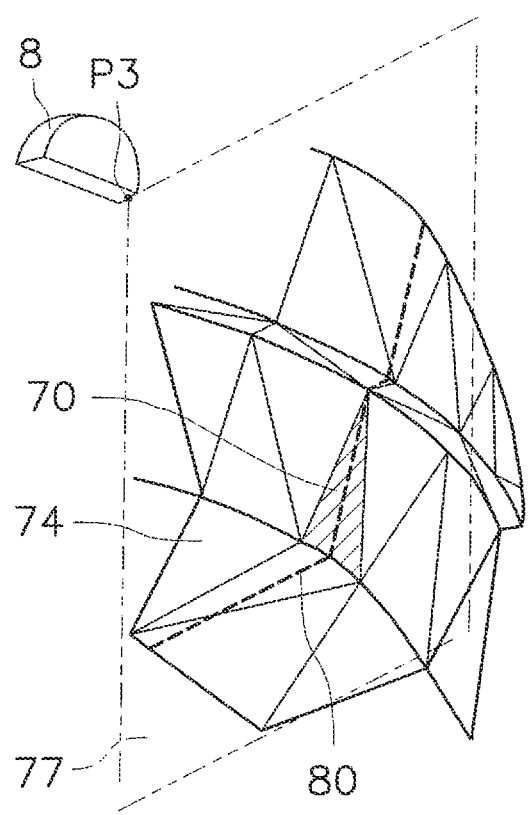
FIG. 4 is an illustration of a design land shape indicated by design land shape data.

The display controller 39 executes the various functions of the display system 28. The display controller 39 and the work machine controller 26 are capable of communicating with each other via wired or wireless communication means. The display controller 39 has a storage unit 43 such as RAM or ROM, and a calculation unit 44 such as a CPU. The storage unit 43 has a work machine data storage unit 47 in which work machine data is stored and a land shape data storage unit 46 in which design land shape data is stored. The work machine data comprises the length L1 of the boom 6, the length 12 of the arm 7, and the length L3 of the bucket 8 described above. The work machine data also comprises the minimum and maximum values for each of the angle of inclination θ1 of the boom 6, the angle of inclination θ2 of the arm 7, and the angle of inclination θ3 of the bucket 8. Design land shape data indicating the shape and position of a three-dimensional design topography in a work area is created in advance and stored in the land shape data storage unit 46. The display controller 39 displays a guidance picture on the display input device 38 based on data such as the design land shape data and the results detected by Eire various sensors described above Specifically, as shown in FIG. 4, the design land shape includes a plurality of design surfaces 74, each of which is represented using a triangular polygon. In FIG. 4, only one of the plurality of design surfaces is labeled 74, while labels for the other design surfaces are omitted. The operator selects one or a plurality of design surfaces among the design surfaces 74 as a target surface 70. The display controller 39 causes the display input device 30 to display a guidance picture showing the positional relationship of the current position of the hydraulic shovel 100 and the target surface 70.

2. Guidance Picture

There follows a detailed description of the guidance picture. The guidance picture has the travel mode guidance picture shown in FIG. 5 (hereafter, "travel mode picture 52") and the digging mode guidance pictures 53, 54 shown in FIG. 7 and FIG. 8. The travel mode picture 52 is a picture showing the positional relationship between the current position of the hydraulic shovel 100 and the target surface 70 in order to guide the hydraulic shovel 100 to proximity to the target surface 70. The digging mode guidance pictures 53, 54 are pictures showing the positional relationship between the current position of the hydraulic shovel 100 and the target surface 70 in order to guide the work machine 2 of the hydraulic shovel 100 so that the ground for digging work takes on the same shape as the target surface 70. The digging mode guidance pictures 53, 54 show the positional relationship of the target surface 70 and the work machine 2 in greater detail than the travel mode picture 52. The digging mode guidance pictures 53, 54 have the rough digging mode guidance picture 53 shown in FIG. 7 (hereafter, "rough digging picture 53") and the fine digging mode guidance picture 54 shown in FIG. 8 (hereafter, "fine digging picture 54").

Figure 5:
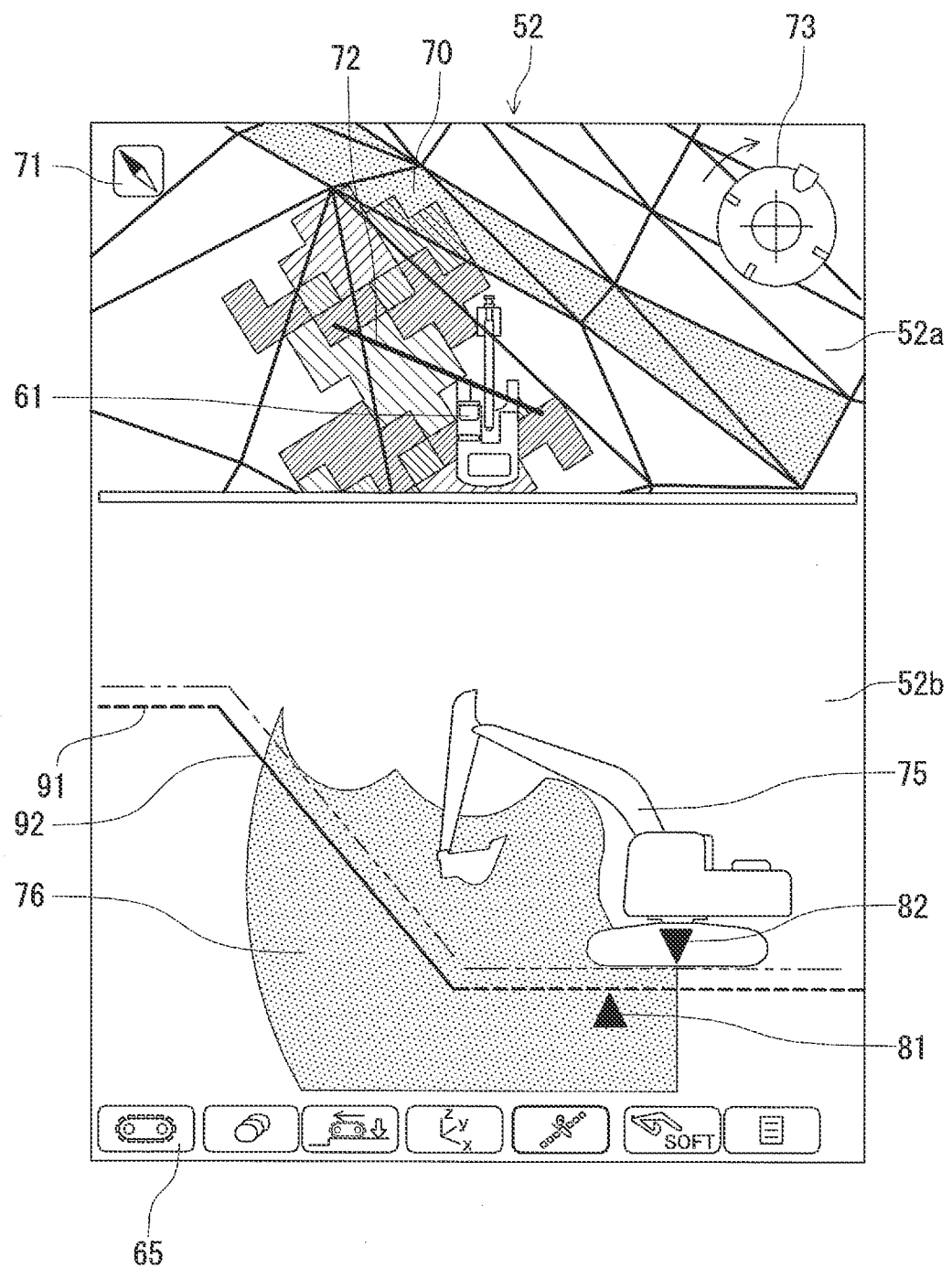
FIG. 5 is an illustration of a guidance picture in travel mode.

FIG. 5 illustrates the travel mode picture 52. The travel mode picture 52 comprises a top view 52a showing the design land shape of the work area and the current position of the hydraulic shovel 100; and a side view 52b showing the target surface 70, the hydraulic shovel 100, and an operability range 76 of the work machine 2.

In the travel mode picture 52 a plurality of operation keys are displayed. The operation keys comprise a picture change key 65. The picture change key 65 is a key for switching between the travel mode picture 52 and the digging mode guidance pictures 53, 54. For example, when the picture change key 65 is pressed once, a pop-up picture for selecting between the travel mode picture 52, the rough digging picture 53, and the fine digging picture 54 is displayed. In a normal state, in which the pop-up picture is not displayed, an icon corresponding to the guidance picture that is currently being displayed among the travel mode picture 52, the rough digging picture 53, and the fine digging picture 54 is displayed as the picture change key 65 in the guidance picture. For example, in FIG. 5, since the travel mode picture 52 is being displayed, an icon showing the travel mode picture 52 is displayed as the picture change key 65. When the rough digging picture 53 is being displayed, as shown in the FIG. 7, an icon showing the rough digging picture 53 is displayed as the picture change key 65.

The top view 52a of the travel mode picture 52 shows the design land shape of the work area and the current position of the hydraulic shovel 100. The top view 52a represents the design land shape as seen from above using a plurality of triangular polygons. Specifically, the top view 52a represents the design land shape using the horizontal plane in a global coordinate system as a plane of projection. The target surface 70 is displayed in a color different from that of the rest of the design surface. In FIG. 5, the current position of the hydraulic shovel 100 is displayed as an icon 61 of the hydraulic shovel as seen from above, but another symbol may be displayed to indicate the current position. The top view 52a includes information for guiding the hydraulic shovel 100 to the target surface 70. Specifically, a directional indicator 71 is displayed. The directional indicator 71 is an icon for showing the direction of the target surface 70 with respect to the hydraulic shovel 100. Thus, an operator can easily move the hydraulic shovel 100 near the target surface 70 using the travel mode picture 52.

The top view 52a of the travel mode picture 52 further includes information showing a target work position and information for bringing the hydraulic shovel 100 directly face-to-face with the target surface 70. The target work position is the optimal position for the hydraulic shovel 100 to perform digging upon the target surface 70, and is calculated on the basis of the position of the target surface 70 and an operability range 76 to be described hereafter. The target work position is displayed as a straight line 72 in the top view 52*a*. The information for bringing the hydraulic shovel 100 directly face-to-face with the target surface 70 is displayed as a facing compass 73. The facing compass 73 is an icon showing the direction directly facing the target surface 70 and the direction of the hydraulic shovel 100 to pivot in. The operator can find the degree to which the shovel faces the target surface 70 using the facing compass 73.

The side view 52*b* of the travel mode picture 52 includes a design surface line 91, a target surface line 92, an icon 75 of the hydraulic shovel 100 as seen from the side, the operability range 76 of the work machine 2, and information indicating the target work position. The design surface line 91 indicates a cross section of the design surface 74 apart from the target surface 70. The target surface line 92 indicates a cross section of the target surface 70. As shown in FIG. 4, the design surface line 91 and the target surface line 92 are obtained by calculating an intersection 80 of the design land shape and a plane 77 passing through a current position of the tip P3 of the bucket 8. The target surface line 92 is displayed in a color different from that of the design surface line 91. In FIG. 5, different types of lines are used to represent the target surface line 92 and the design surface line 91.

The operability range 76 indicates the range around the main vehicle body 1 which can be actually reached by the work machine 2. The operability range 76 is calculated from the work machine data stored in the storage unit 43. The target work position shown in the side view 52*b* is equivalent to the target work position shown in the top view 52*a* described above, and is indicated by a triangular icon 81. A triangular icon 82 indicates a target point on the hydraulic shovel 100. The operator moves the hydraulic shovel 100 so that the icon 82 for the target point converges with the icon 81 for the target work position.

As described above, the travel mode picture 52 includes information showing the target work position and information for bringing the hydraulic shovel 100 directly face-to-face with the target surface 70. An operator is thereby capable of disposing the hydraulic shovel 100 in the optimal position and direction for performing work upon the target surface 70 using the travel mode picture 52. Thus, the travel mode picture 52 is used to position the hydraulic shovel 100.

As described above, the target surface line 92 is calculated based on the current position of the tip of the bucket 8. The display controller 39 calculates the current position of the tip of the bucket 8 in a global coordinate system $\{X, Y, Z\}$ based on the results detected by the three-dimensional position sensor 23, the first through third stroke sensors 16 to 18, the inclination angle sensor 24, and the like. Specifically, the current position of the tip of the bucket 8 is obtained as follows.

Figure 6:
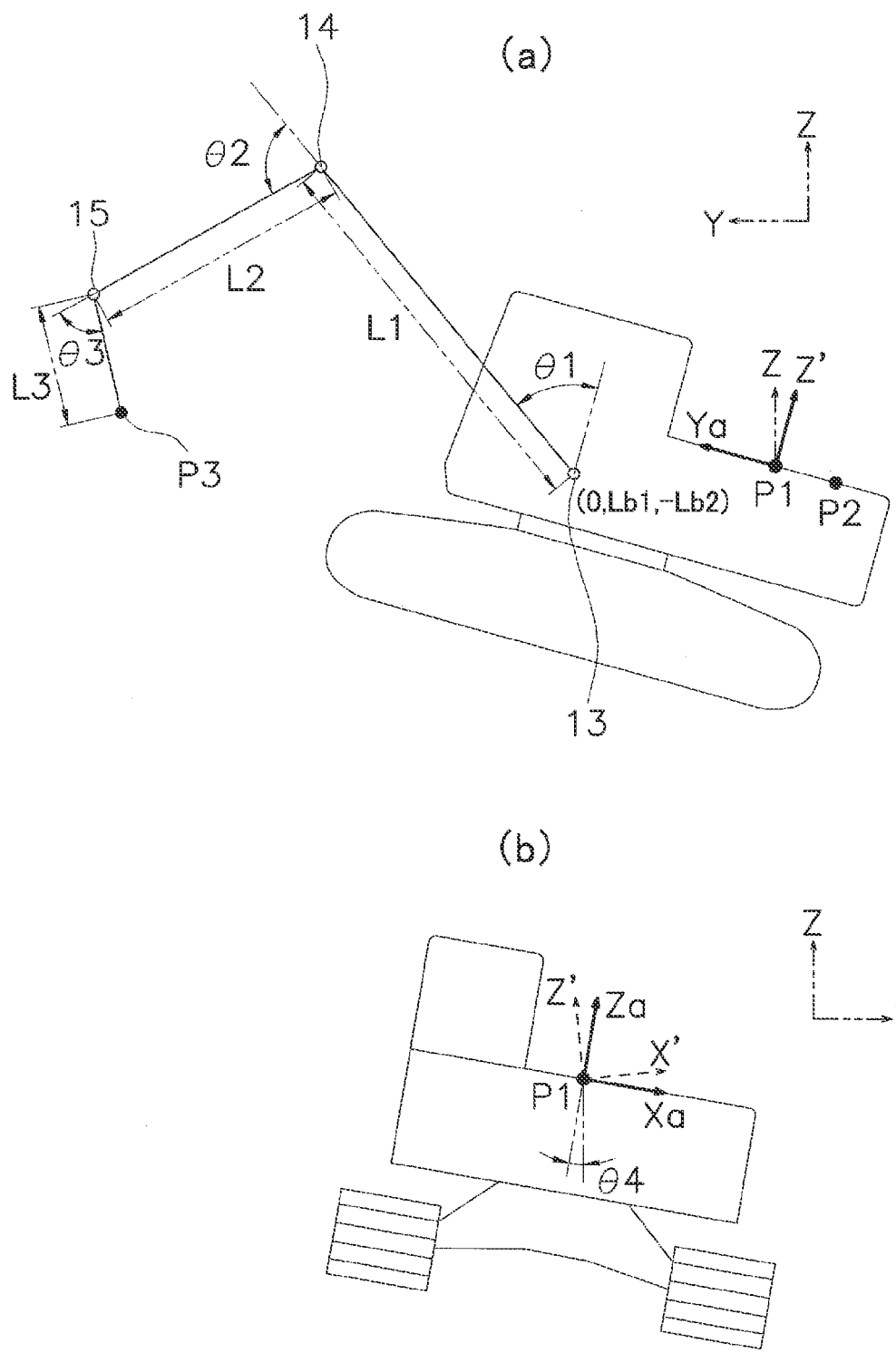
FIG. 6 shows a method of calculating the current position of the tip of a bucket.

First, as shown in FIG. 6, a main vehicle body coordinate system $\{Xa, Ya, Za\}$ whose point of origin is the mounting position P1 of the GNSS antenna 21 described above is obtained. FIG. 6(*a*) is a side view of the hydraulic shovel 100. FIG. 6(*b*) is a rear view of the hydraulic shovel 100. Here, the front-back direction of the hydraulic shovel 100, i.e., the Ya axis direction of the main vehicle body coordinate system, is inclined with respect to the Y axis direction of the global coordinate system. The coordinates of the boom pin 13 in the main vehicle body coordinate system are (0, Lb1, −Lb2), and are stored in the storage unit 43 of the display controller 39 in advance.

The three-dimensional position sensor 23 detects the mounting positions P1, P2 of the GNSS antennas 21, 22. A unit vector for the Ya axis direction is calculated from the detected coordinate positions P1, P2 according to the following formula (1).

$$Ya = (P1 - P2)/|P1 - P2| \quad (1)$$

As shown in FIG. 6(*a*), introducing a vector Z′ which is perpendicular to Ya and passes through the plane described by the two vectors Ya and Z, the following relationships are obtained.

$$(Z', Ya) = 0 \quad (2)$$

$$Z' = (1-c)Z + cYa \quad (3)$$

In the above formula (3), c is a constant.

Based on formula (2) and (3), Z′ is represented by the following formula (4).

$$Z' = Z + \{(Z, Ya)/((Z, Ya) - 1)\}(Ya - Z) \quad (4)$$

Furthermore, if X′ is a vector perpendicular to Ya and Z′, X′ is obtained in the following formula (5).

$$X' = Ya \perp Z' \quad (5)$$

As shown in FIG. 6(*b*), the main vehicle body coordinate system is rotated around the Ya axis by the roll angle θ4, and is thus shown as in the following formula (6).

$$[Xa \ Ya \ Za] = [X' \ Ya \ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

The current angles of inclination θ1, θ2, θ3 of the boom 6, arm 7, and bucket 8 as described above, respectively are calculated from the results detected by the first through third stroke sensors 16 to 18. The coordinates (xat, yat, zat) of the tip P3 of the bucket 8 in the main vehicle body coordinate system are calculated according to the following formulas (7) through (9) using the angles of inclination θ1, θ2, θ3 and the boom 6, arm 7, and bucket 8 lengths L1, L2, L3.

$$xat = 0 \quad (7)$$

$$yat = Lb1 + L1 \sin\theta 1 + L2 \sin(\theta 1 + \theta 2) + L3 \sin(\theta 1 + \theta 2 + \theta 3) \quad (8)$$

$$zat = -Lb2 + L1 \cos\theta 1 + L2 \cos(\theta 1 + \theta 2) + L3 \cos(\theta 1 + \theta 2 + \theta 3) \quad (9)$$

The tip P3 of the bucket 8 moves along the plane Ya-Za in the main vehicle body coordinate system.

The coordinates of the tip P3 of the bucket 8 in the global coordinate system are obtained according to the following formula (10).

$$P3 = xat \cdot Xa + yat \cdot Ya + zat \cdot Za + P1 \quad (10)$$

As shown in FIG. 4, the display controller 39 calculates, on the basis of the current position of the tip of the bucket 8 calculated as described above and the design land shape data stored in the storage unit 43, an intersection 80 of the three-dimensional design land shape and a Ya-Za plane 77 through which the tip P3 of the bucket 8 passes. The display controller 39 displays the part of the intersection passing through the target surface 70 in the guidance picture as the target surface line 92 described above.

2-2. Rough Digging Picture 53

Figure 7:
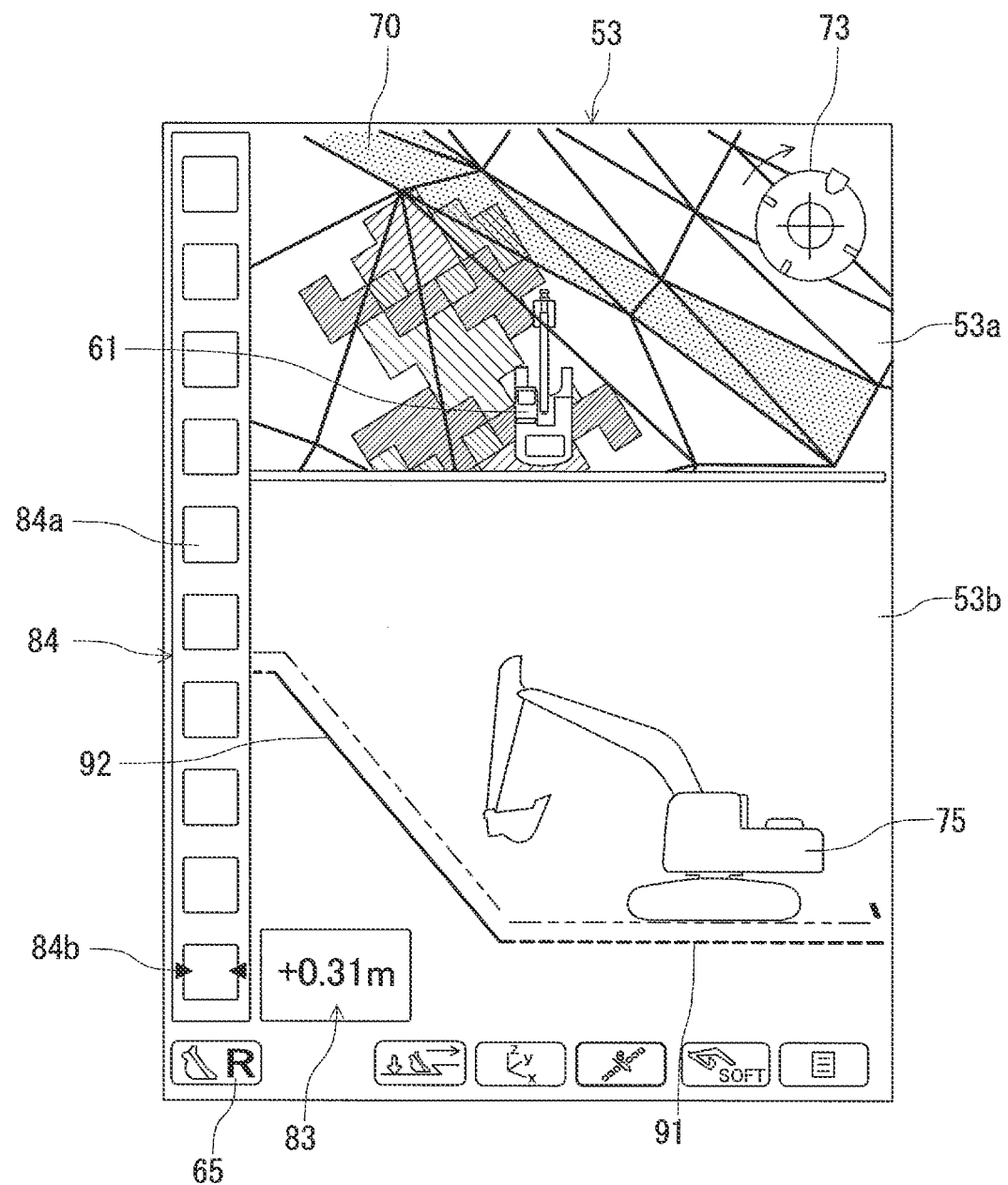
FIG. 7 is an illustration of a rough digging mode of a guidance picture.

FIG. 7 illustrates the rough digging picture 53. The rough digging picture 53 shows a picture change key 65 like that of the travel mode picture 52 as described above. The rough digging picture 53 also includes a top view picture 53a showing the design land shape of the work area and the current position of the hydraulic shovel 100, and a side view 53b showing the target surface 70 and the hydraulic shovel 100.

The top view screen 53a of the rough digging picture 53, unlike the top view 52a of the travel mode picture 52 described above, represents the design land shape using a pivoting plane of the hydraulic shovel 100 as the plane of projection. Thus, the top view 53a is a view directly from above the hydraulic shovel 100, and the design surface tilts when the hydraulic shovel 100 tilts. The side view 53b of the rough digging picture 53 includes information showing the design surface line 91, the target surface line 92, and the icon 75 of the hydraulic shovel 100 as seen from the side, and the positional relationship of the bucket 8 and the target surface 70. The information showing the positional relationship of the bucket 8 and the target surface 70 includes the numerical value information 83 and the graphic information 84. The numerical value information 83 is a numerical value indicating the shortest distance between the tip of the bucket 8 and the target surface line 92. The graphic information 84 is information graphically indicating the shortest distance between the tip of the bucket 8 and the target surface line 92. Specifically, the graphic information 84 includes index bars 84a and an index mark 84b indicating a position among positions of the index bars 84a where the distance between the tip of the bucket 8 and the target surface line 92 is equivalent to zero. The index bars 84a are configured so as to illuminate according to the shortest distance between the tip of the bucket 8 and the target surface line 92. Displaying the graphic information 84 may be switched on/off through the operator's operation.

As described above, numerical values indicating the relative positional relationship between the target surface line 92 and the hydraulic shovel 100 and the shortest distance between the tip of the bucket 8 and the target surface line 92 are displayed in detail in the rough digging picture 53. The operator can set the tip of the bucket 8 to move along the target surface line 92 so that the current land shape becomes the three-dimensional design land shape, which leads to easy operation of digging.

2-3. Fine Digging Picture 54

Figure 8:
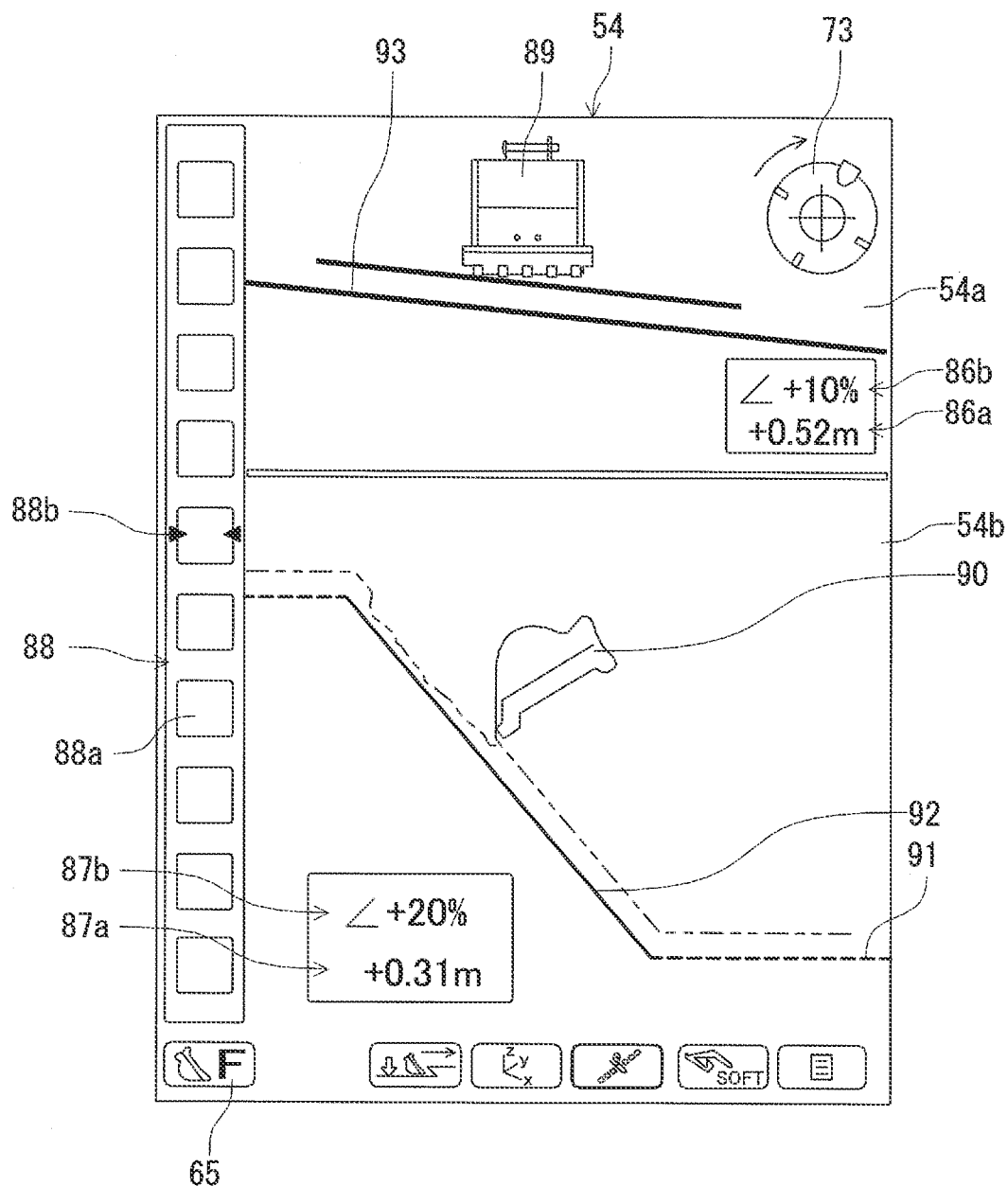
FIG. 8 is an illustration of a fine digging mode of a guidance picture.

FIG. 8 illustrates the fine digging picture 54. The fine digging picture 54 shows the positional relationship between the target surface 70 and the hydraulic shovel 100 in greater detail than the rough digging picture 53. The fine digging picture 54 shows a picture change key 65 like that of the travel mode picture 52 described above. In FIG. 8, since the fine digging picture 54 is displayed, the icon showing the fine digging picture 54 is displayed as the picture change key 65. The fine digging picture 54 has a head-on view 54a showing the target surface 70 and the bucket 8, and a side view 54b showing the target surface 70 and the bucket 8. The head-on view 54a of the fine digging picture 54 includes an icon 89 of the bucket 8 as seen head-on and a line indicating a cross-section of the target surface 70 as seen head-on hereafter, "target surface line 93"). The side view 54b of the fine digging picture 54 includes the icon 90 of the bucket 8 as seen from the side, the design surface line 91, and the target surface line 92. Both the head-on view 54a and the side view 54b of the fine digging picture 54 show information indicating the positional relationship between the target surface 70 and the bucket 8.

The information indicating the positional relationship between the target surface 70 and the bucket 8 on the head-on view 54a includes distance information 86a and angle information 86b. The distance information 86a indicates the distance between the tip of the bucket 8 and the target surface line 93 in the direction Za. The angle information 86b is information indicating the angle between the target surface line 93 and the bucket 8. Specifically, the angle information Sob is the angle between an imaginary line passing through the tips of the plurality of teeth of the bucket 8 and the target surface line 93.

The information indicating the positional relationship between the target surface 70 and the bucket 8 in the side view 54b includes distance information 87a and angle information 87b. The distance information 87a indicates the shortest distance between the target surface line 92 and the tip of the bucket 8, i.e., the distance between the target surface line 92 and the tip of the bucket 8 in the direction of a line perpendicular to the target surface line 92. The angle information 87b is information indicating the angle between the target surface line 92 and the bucket 8. Specifically, the angle information 87b displayed in the side view 54b is the angle between the bottom surface of the bucket 8 and the target surface line 92.

The fine digging picture 54 includes graphic information 88 graphically indicating the shortest distance between the tip of the bucket 8 and the target surface line 92. The graphic information 88, like the graphic information 84 of the rough digging picture 53, has an index bar 88a and an index mark 88b.

As described above, the relative positional relationships between the target surface lines 92, 93 and the bucket 8 are shown in the fine digging picture 54. The operator can set the tip of the bucket 8 to move along the target surface lines 92, 93 so that the current land shape takes on the same shape as the three-dimensional design land shape, which leads to easier operation of digging,

3. Guidance Picture Display Range Optimization Control

Figure 9:
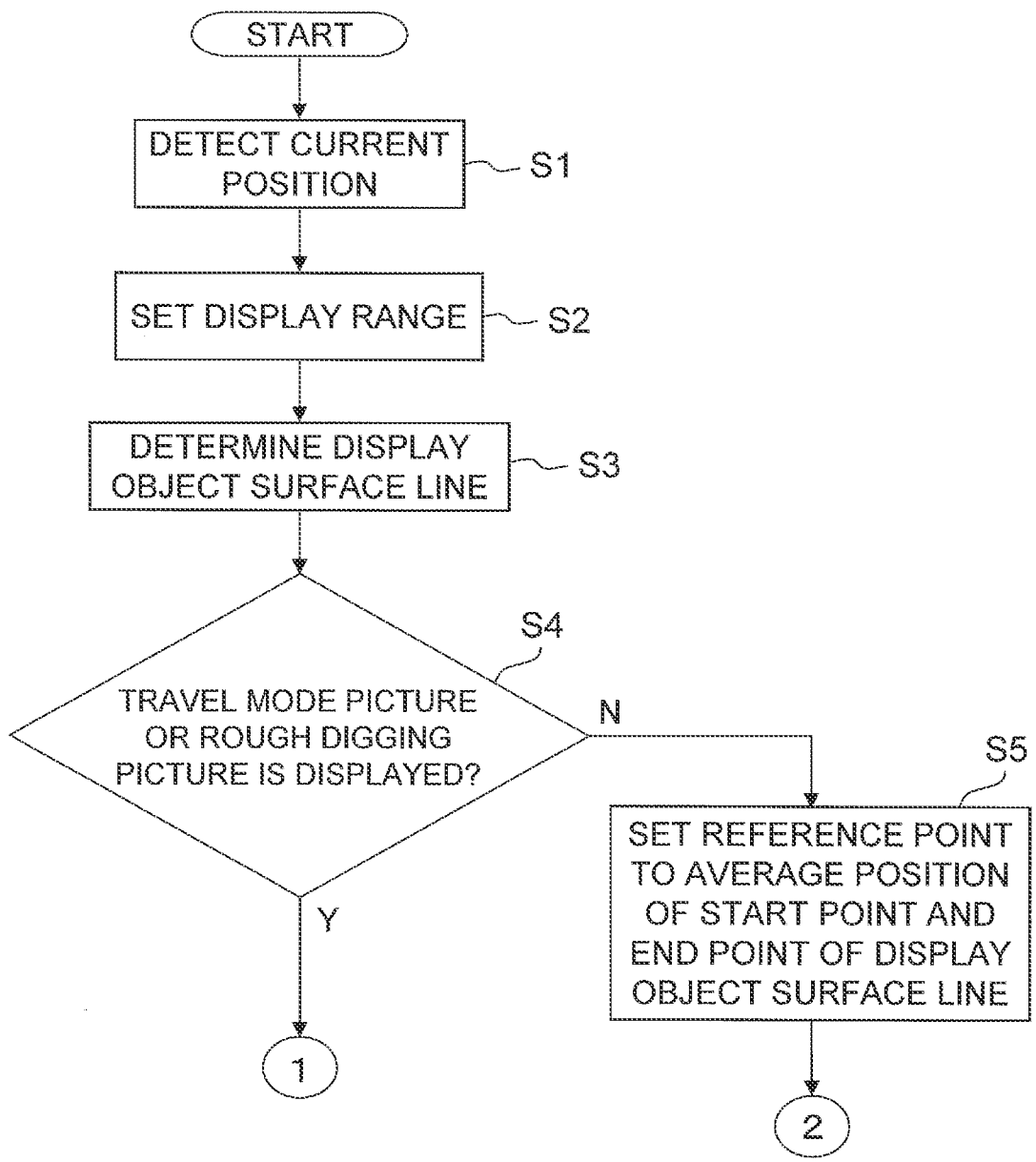
FIG. 9 is a flow chart showing display range optimization control processes.
Figure 10:
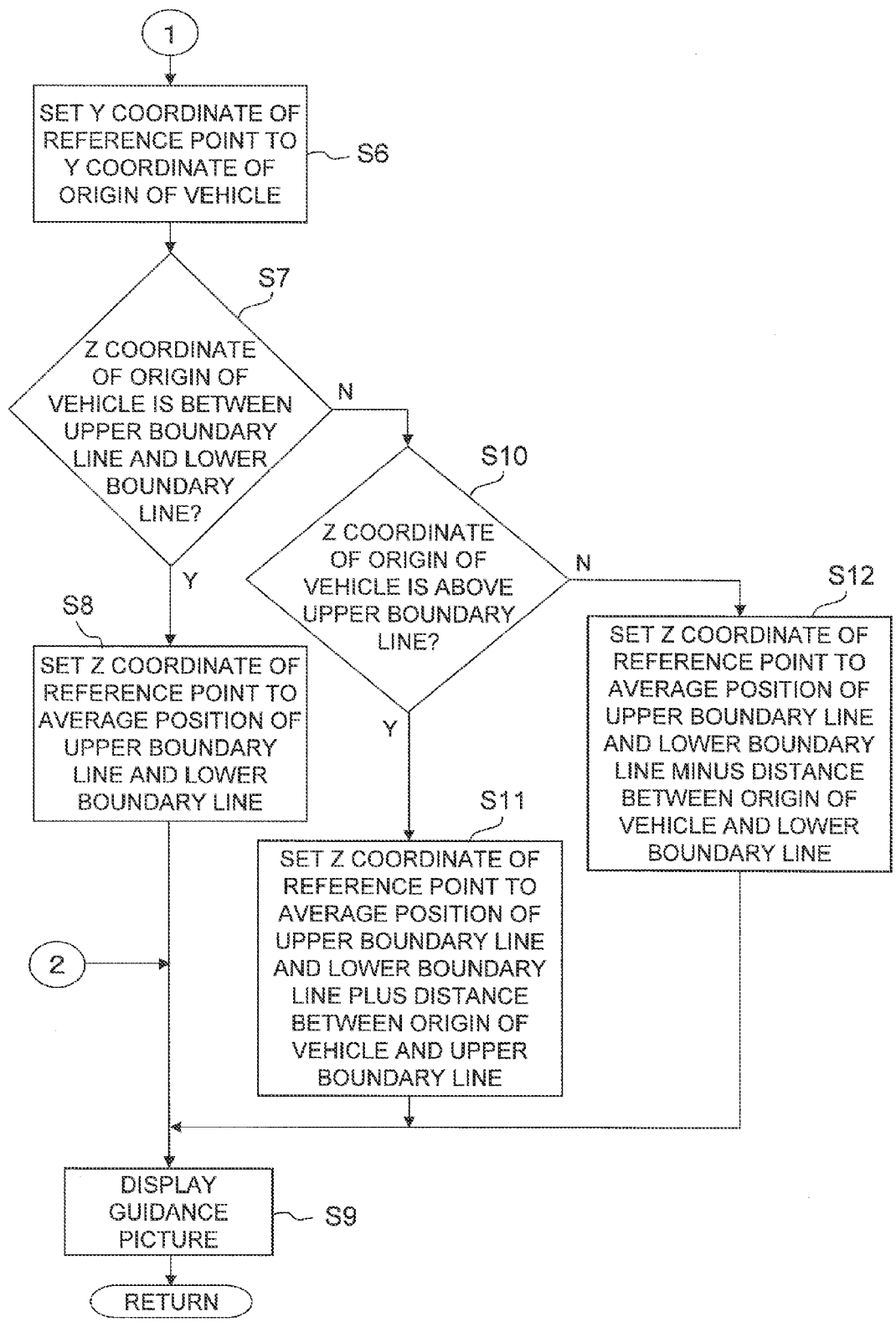
FIG. 10 is a flow chart showing display range optimization control processes.

Next, a display range optimization control of the guidance picture executed by the computing unit 44 of the display controller 39 will be described. The display range optimization control is control for optimizing the display range so that an operator can easily ascertain the positional relationship of the target surface 70 and the work machine 2. The display range indicates the range displayed as a guidance picture for the design land shape data described above. In other words, the part included in the display range of the design land shape represented by the design land shape data is displayed as the guidance picture. As described above, the travel mode picture 52 and the rough digging picture 53 includes top views 52a, 53a and side views 52b 53b, respectively. The fine digging picture 54 includes the head-on view 54a and the side view 54b. The display range optimization control in the present embodiment is for optimizing the display range for the side views in the various guidance pictures. FIGS. 9 and 10 are flow charts showing the display range optimization control processes.

In step S1, the current position of the main vehicle body 1 is detected. Here, as described above, the calculation unit 44 calculates the current position of the main vehicle body 1 in the global coordinate system based on the detection signal from the position detector unit 19.

Figure 11:
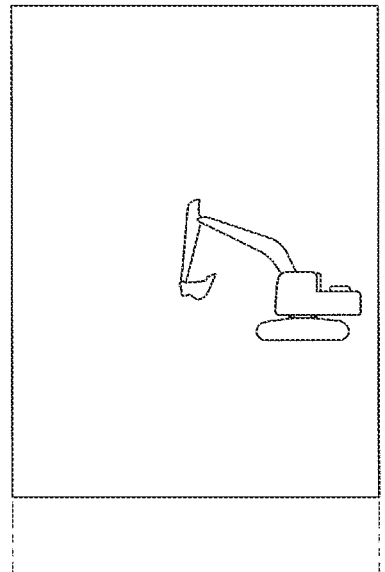
FIG. 11 is an illustration of an example of a display area on a display unit.
Figure 11:
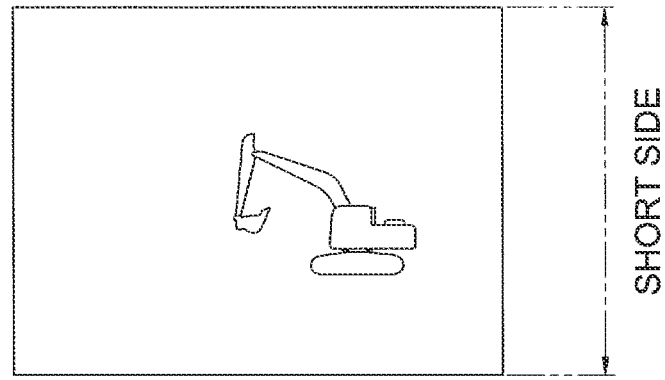
Figures 12, 13:
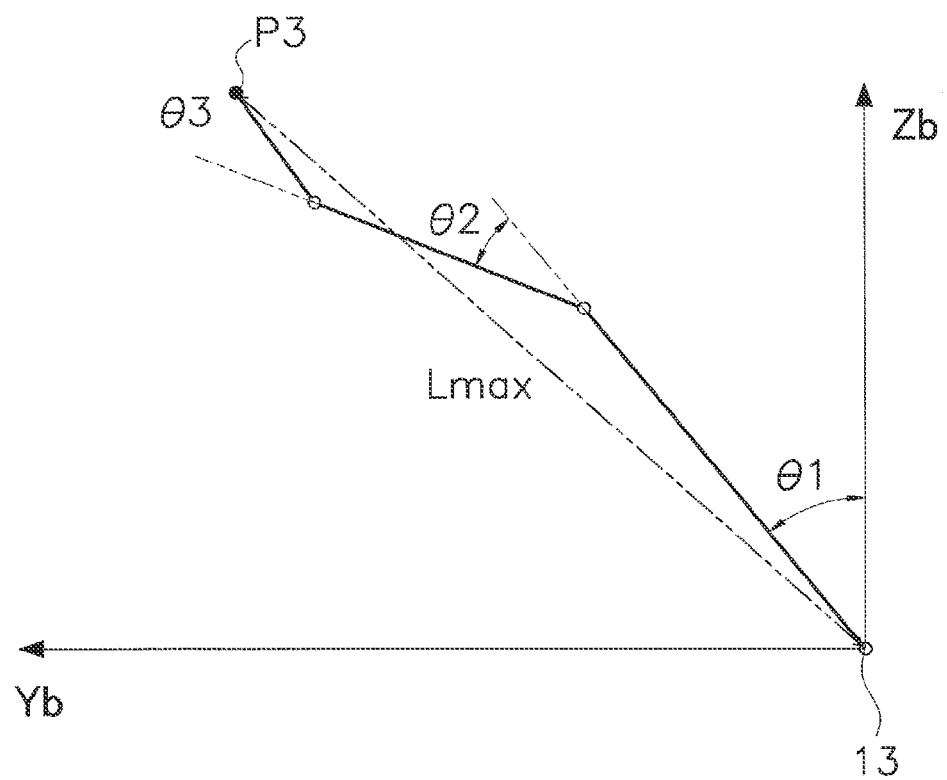
FIG. 12 is a table showing the length of the short side of the display range.
FIG. 13 is an illustration of the posture of a work machine when the reach length of the work machine is at maximum.

In step S2, the display range is set. Here, the calculation unit 44 sets a rectangular display range. The calculation unit 44 determines whether a short side of the display range is a vertical side or a horizontal side based on the screen aspect ratio of the part of the display unit 42 showing the guidance picture (hereafter, the "display area"). For example, when the display area has a vertically elongated shape, as shown in FIG. 11(a), the horizontal side is obtained as the short side. When the display area has a horizontally elongated shape, as shown in FIG. 11(b), the vertical side is obtained as the short side. The screen aspect ratio is saved in a storage unit, not shown in the drawings, in the display input device 38, and read by the display controller 39. The calculation unit 44 determines the reduced scale for displaying the guidance picture within the display area so that a predetermined range of the guidance picture falls within the range of the short side of the display range. Specifically, as shown in FIG. 12, the length of the short side of the display range is set with reference to the maximum reach length of the work machine 2. For example, in the travel mode picture, the educed scale of the display range is set so that the length of the short side of the display range is twice that of the maximum reach length. In the rough digging picture, the reduced scale of the display range is set so that the length of the short side of the display range is 1.5 times that of the maximum reach length. In the fine digging picture, the reduced scale of the display range is set so that the length of the short side of the display range is 1.2 times that of the maximum reach length.

The maximum reach length of the work machine 2 is calculated from the work machine data. As shown in FIG. 13, the maximum reach length is the length of the work machine 2 when the work machine 2 is maximally extended, i.e., the length between the boom pin 13 and the tip P3 of the bucket 8 when the work machine 2 is maximally extended. FIG. 13 schematically illustrates the posture of the work machine 2 when the length of the work machine 2 is equivalent to the maximum reach length Lmax (hereafter, "maximum reach posture"). The origin of the coordinate plane Yb-Zb shown in FIG. 13 is the position of the boom pin 13 in the main vehicle body coordinate system {Xa, Ya, Za} described ab in the maximum reach posture, the arm angle θ2 is at the minimum value. The bucket angle θ3 is calculated using numerical analysis for parameter optimization so that the reach length of the work machine 2 is at the maximum. The maximum reach length Lmax is calculated based on these results.

Figure 14:
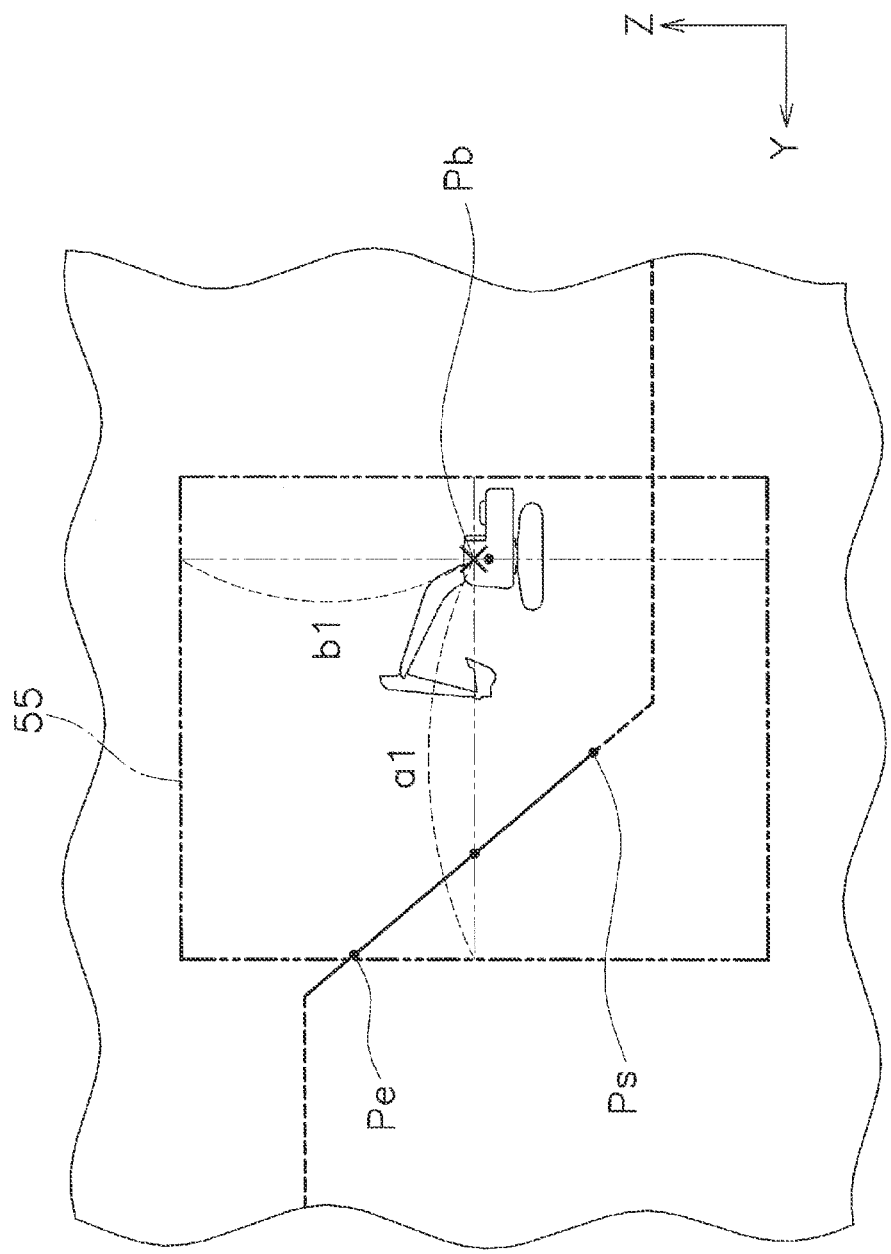
FIG. 14 is an illustration of an example of a display range.

A display range 55 as shown in FIG. 14 is set through the above processes. The length of the long side of the display range 55 is calculated from the above-described length of the short side and the aspect ratio of the screen. The predetermined position in the display range 55 is set as a reference point Pb. The reference point Pb is fixedly set for each type of guidance pictures. Specifically, the reference point Pb is represented by a distance a1 in the Y axis direction and a distance b1 in the Z axis direction (hereafter, the "offset values") from one vertex of the display range 55. Unique offset values a1, b1 for the reference point Pb are set for each of the travel mode picture 52, the rough digging picture 53, and the fine digging picture 54.

Figure 15:
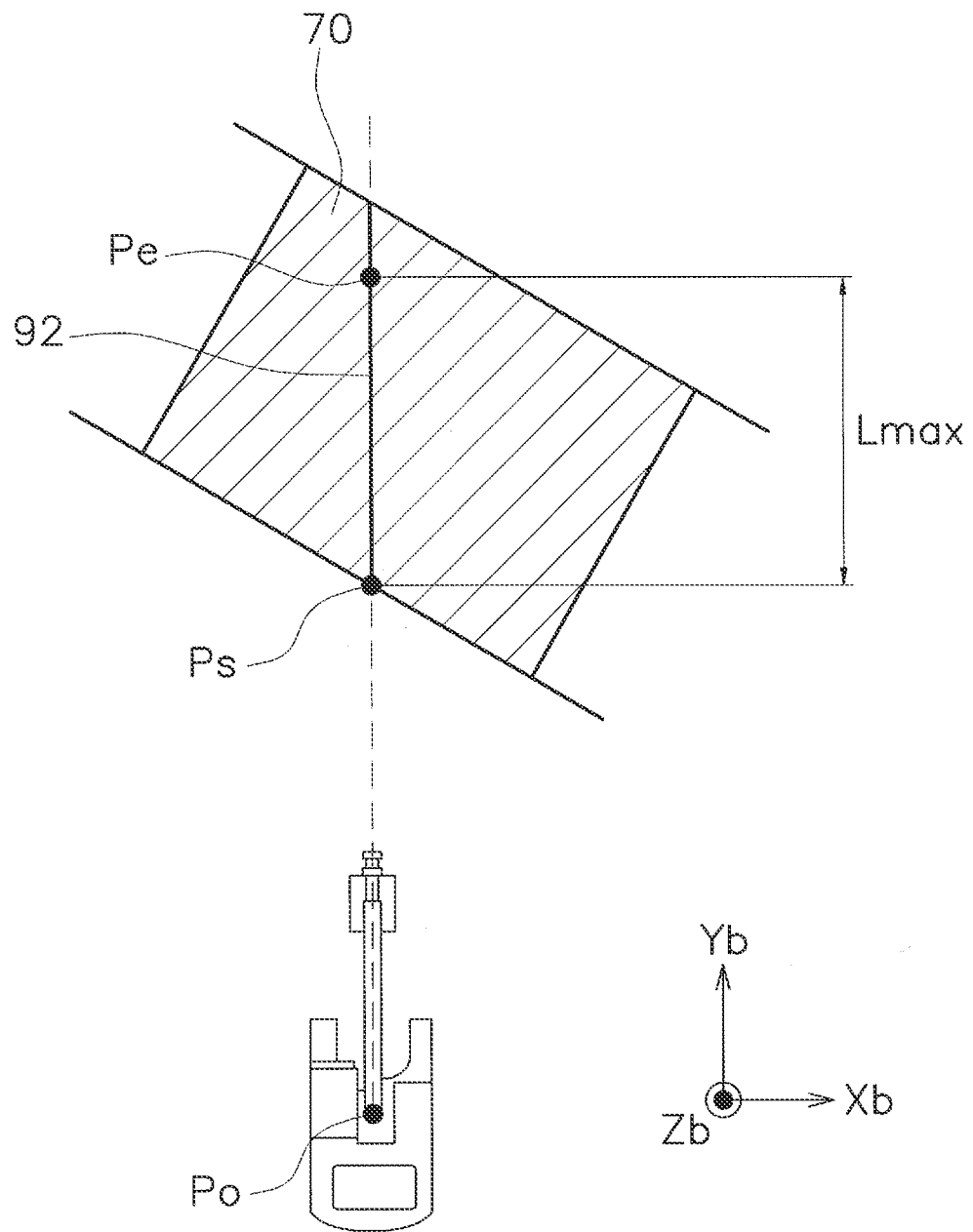
FIG. 15 is an illustration of an example of the positions of a start point and an end point.
Figure 16:
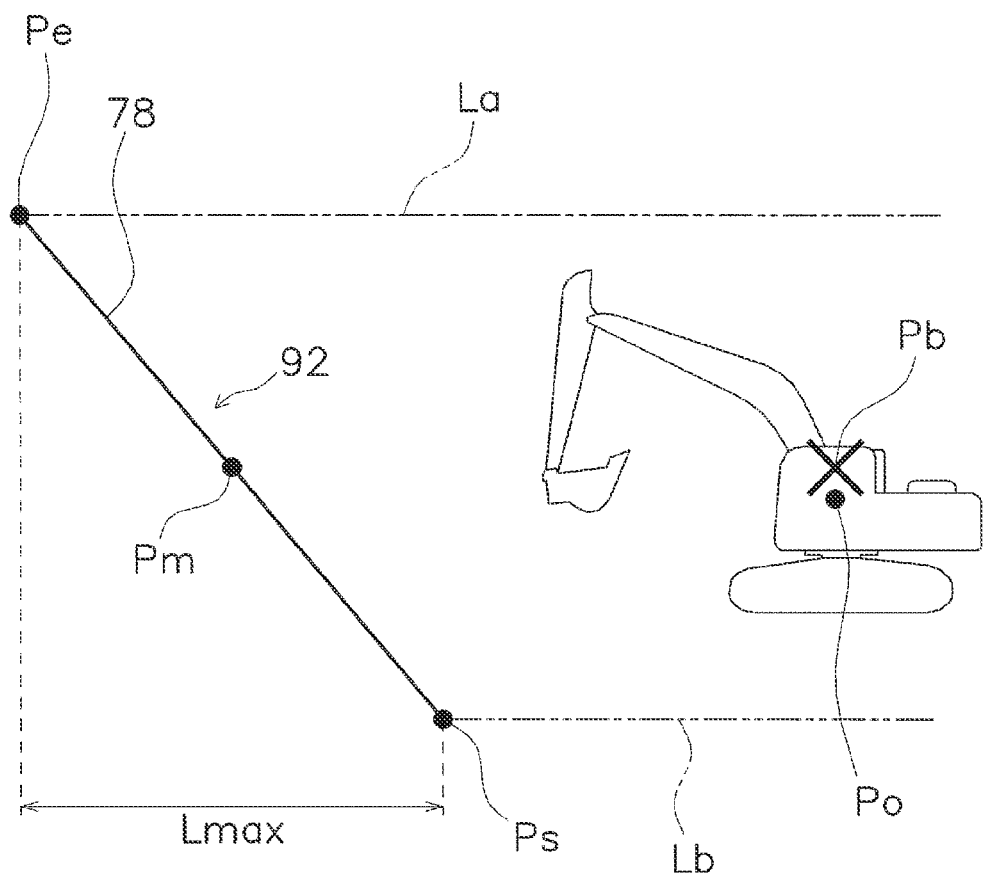
FIG. 16 shows an example of a display object surface line and a method of setting a reference point for a display range.
Figure 17:
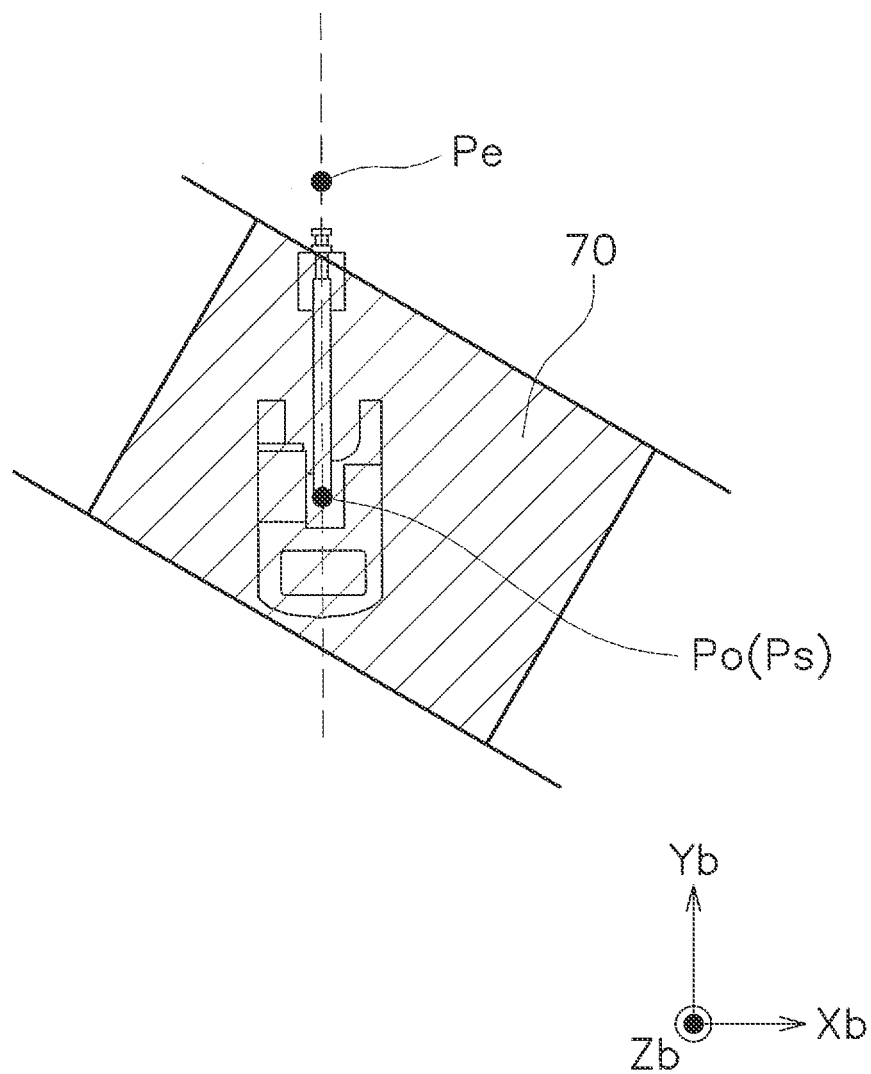
FIG. 17 is an illustration of an example of the positions of a start point and an end point.
Figure 18:
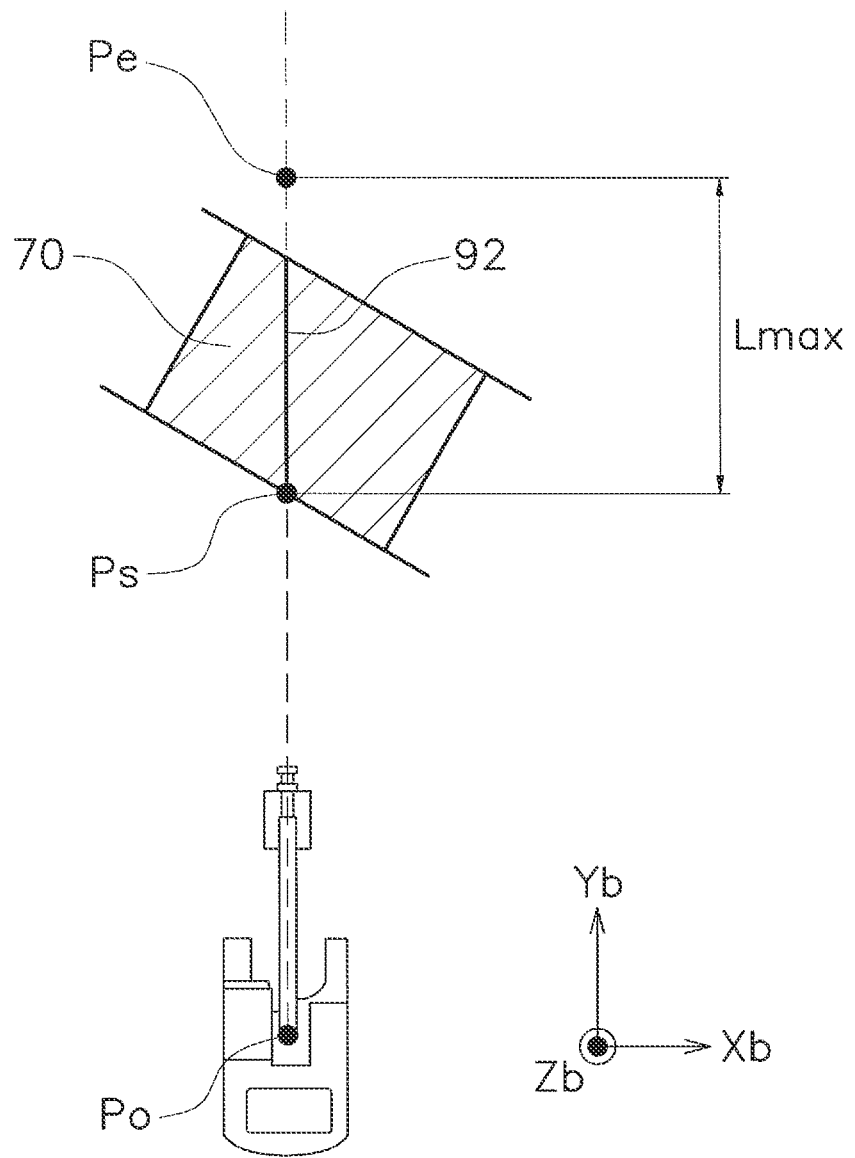
FIG. 18 is an illustration of an example of the positions of a start point and an end point.
Figure 19:
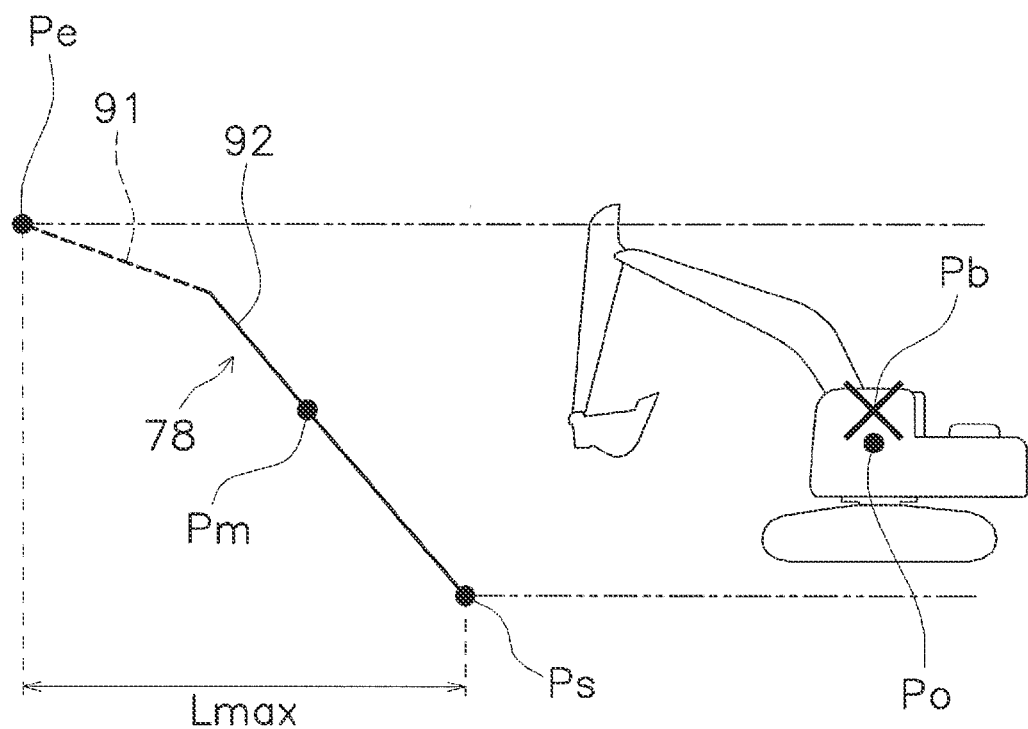
FIG. 19 shows a display object surface line and a method of setting a reference point for a display range.

Returning to FIG. 9, in step S3, the display object surface line is determined. At this point, as shown in FIG. 15, the calculation unit 44 calculates a start point Ps and an end point Pe on the target surface line 92 as seen from the side based on the land shape data, the work machine data, and the current position of the main vehicle body. The start point Ps is the position on the target surface line 92 nearest the main vehicle body 1. The end point Pe is a position set apart from the start point Ps by the maximum reach length Lmax of the work machine 2. Specifically, the coordinates of the start point Ps and the end point Pe on the intersection of the Yb-Zb plane and the target surface 70 are calculated. The coordinates of the start point Ps and the end point Pe on the target surface line 92 are thereby calculated, as shown, for example, in FIG. 16, and the part of the target surface line 92 between the start point Ps and the end point Pe is determined to be a display object surface line 78. However, when the main vehicle body 1 is positioned on the target surface 70, as shown in FIG. 17, the position of the origin of the vehicle Po (here, the current position of the bucket pin 13) is determined to be the position of the start point Ps. When the target surface line 92 is shorter than the maximum reach length Lmax, as shown in FIG. 18, the end point Pe is positioned outside the target surface 70. In cases that a position set apart from the start point Ps by the maximum reach distance is positioned outside the target surface 70 as well, as shown in FIG. 17, the end point Pe is positioned outside the target surface 70. Here, as shown in FIG. 19, the coordinates of the start point Ps on the target surface line 92 and the end point Pe on the design surface line 91 adjacent to the target surface line 92 are calculated, and the part of the target surface line 92 and the design surface line 91 between the start point Ps and the end point Pe is determined to be the display object surface line 78.

Returning to FIG. 9, in step S4, it is determined whether or not the travel mode picture 52 or the rough digging picture 53 is displayed on the display unit 42. When neither the travel mode picture 52 nor the rough digging picture 53 is displayed on the display unit 42, the flow continues to step S5. In other words, when the fine digging picture 54 is displayed on the display unit 42, the flow continues to step S5.

Figure 20:
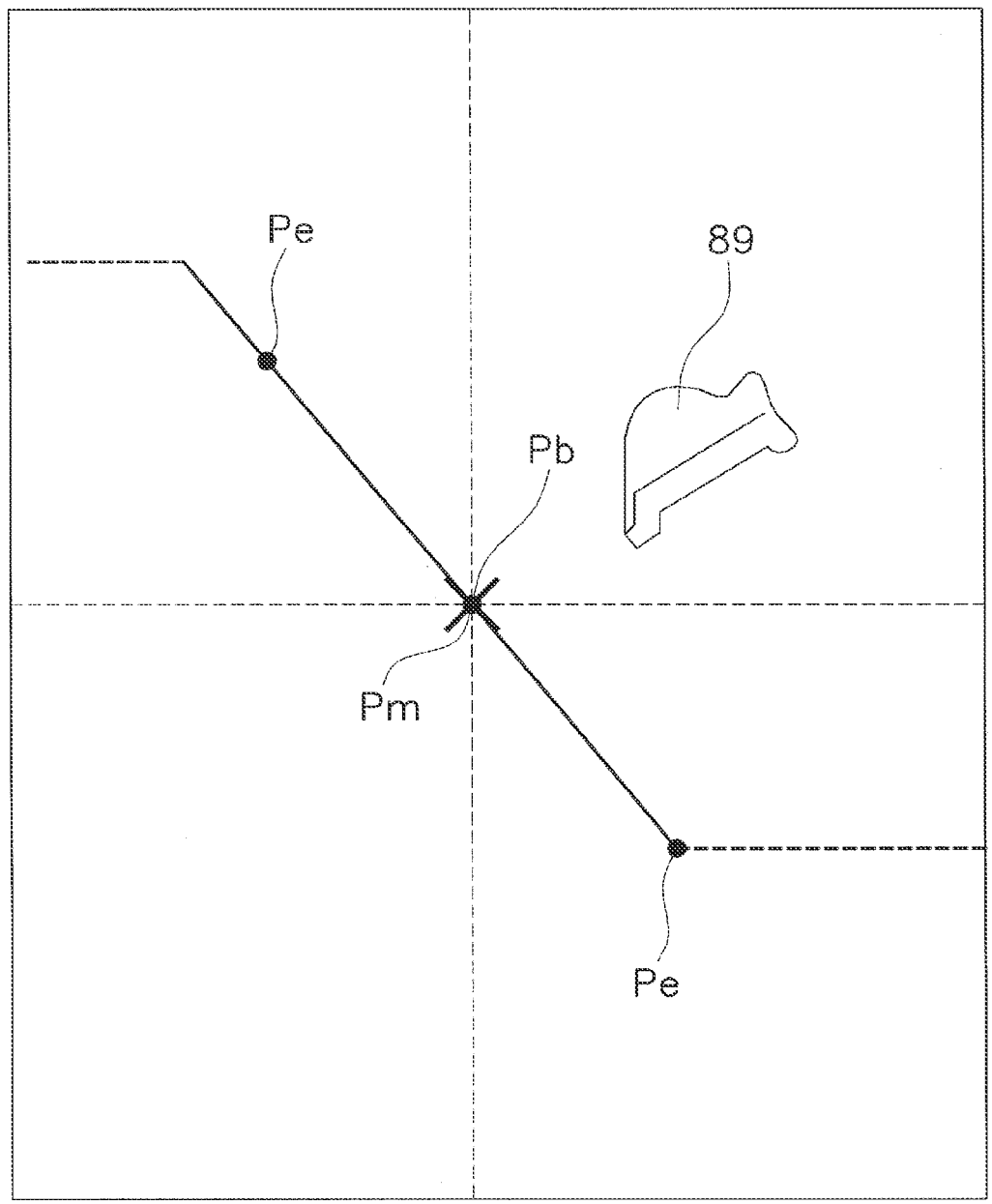
FIG. 20 shows a method of setting a reference point for a display range in a fine digging mode guidance picture.
Figure 21:
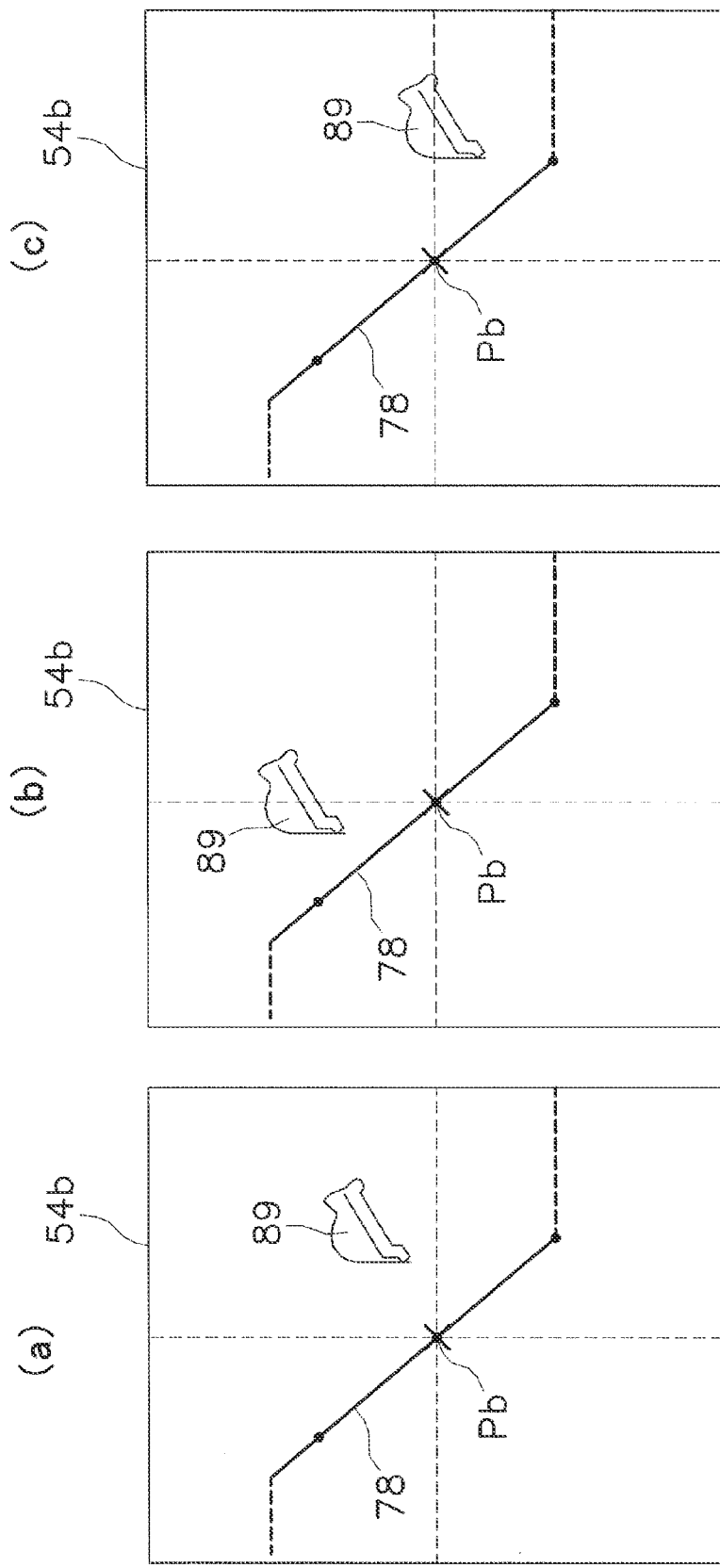
FIG. 21 is an illustration of changes of images in a fine digging mode guidance picture.

In step S5, the reference point Ph is set as the average position of the start point Ps and the end point Pe on the display object surface line 78. Specifically, as shown in FIG. 20, the reference point Pb is set at a midpoint Pm between the start point Ps and the end point Pe. In step S9 shown in FIG. 10, a guidance picture, namely, the fine digging picture 54 is displayed. Because the midpoint Pm between the start point Ps and the end point Pe is set as the reference point Pb, as described above, the display object surface line 78 is fixedly displayed in the side view 54b of the fine digging picture 54, and the icon 89 for the bucket 8 is displayed so as to move across the side view 54b of the fine digging picture 54, as shown in FIGS. 21(a) to 21(c).

Returning to FIG. 9, when it is determined in step S4 that the travel mode picture 52 or the rough digging picture 53 is displayed on the display unit 42, the flow continues to step S6 shown in FIG. 10. In step S6, as shown in FIG. 16, the Y coordinate of the reference point Pb is set to the Y coordinate of the origin of vehicle Po.

Next, in step S7, it is determined whether the Z coordinate of the origin of vehicle Po is between an upper boundary line and a lower boundary line. The upper boundary line indicates the height of the top of the display object surface line 78. The lower boundary line indicates the height of the bottom of the display object surface line 78. For example, as shown in FIG. 16, an upper boundary line La is a line parallel with the Y axis passing through the end point Pe of the display object surface line 78. A lower boundary line Lb is a line parallel to the Y axis passing through the start point Ps of the display object surface line 78. When the Z coordinate of the origin of vehicle Po is determined to be between the upper boundary line La and the lower boundary line Lb, the flow continues to step S8.

In step S8, the Z coordinate of the reference point Pb is set to the average position of the upper boundary line La and the lower boundary line Lb. At this point, as shown in FIG. 16, the Z coordinate of the reference point Pb is fixed at the Z coordinate of the midpoint Pm between the upper boundary line La and the lower boundary line Lb. The guidance picture is then displayed in step S9. Specifically, the travel mode picture 52 or the rough digging picture 53 is displayed. For example, in a case in which the rough digging picture 53 is displayed, as shown in FIGS. 22(a) to 22(c), when the main vehicle body 1 moves up or down between the upper boundary line La and the lower boundary line Lb, the display object surface line 78 is fixedly displayed in the side view 53b of the rough digging picture 53, and the icon 75 for the hydraulic shovel 100 is displayed moving up or down in the side view 53b of the rough digging picture 53. The side view 53b of the rough digging picture 53 is displayed in a manner similar to the side view 52b of the travel mode picture 52.

Figure 23:
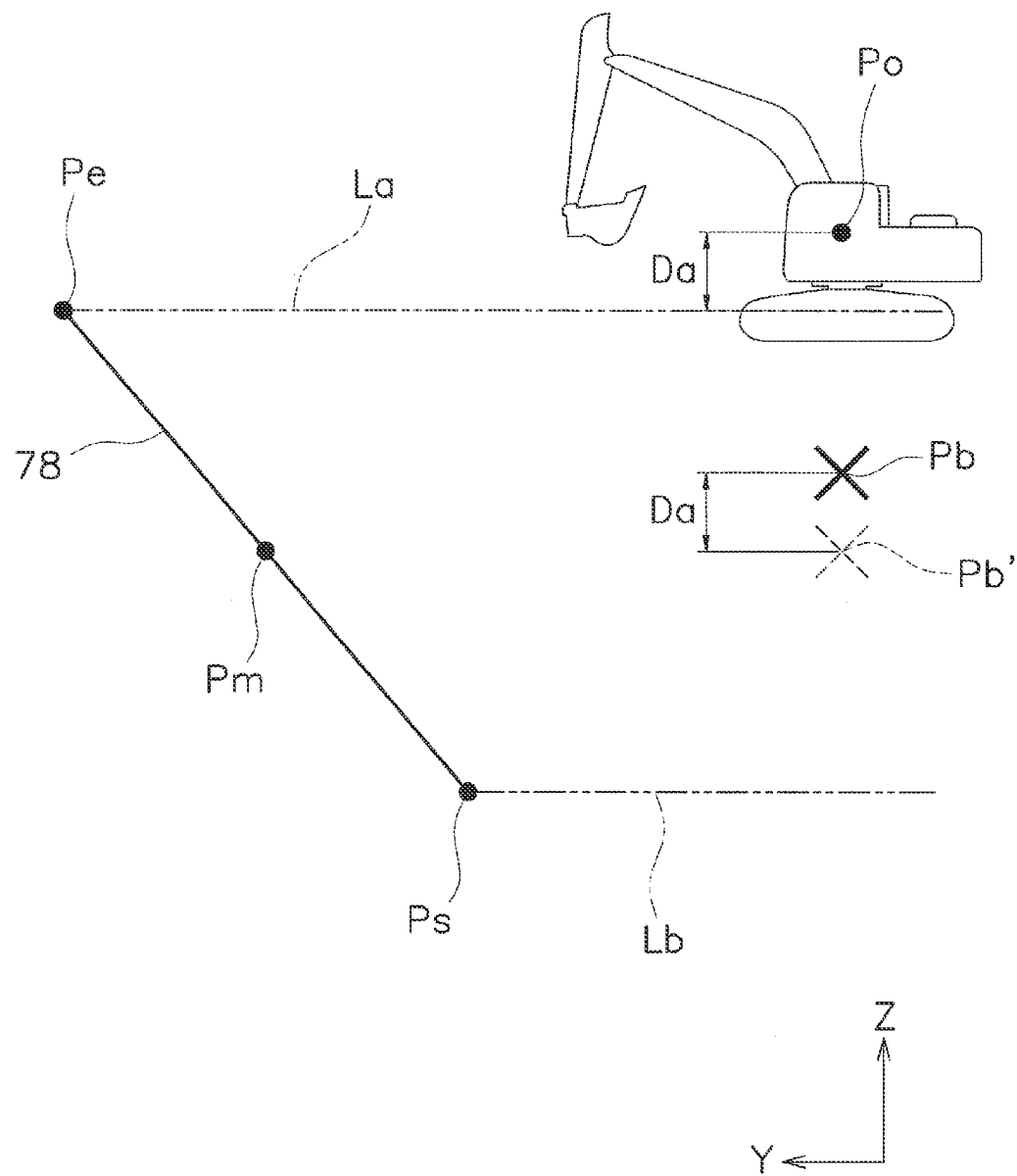
FIG. 23 shows a method of setting a reference point for a display range in a travel mode and a rough digging mode guidance picture.

When it is determined in step S7 that the Z coordinate of the origin of vehicle Po is not between the upper boundary line La and the lower boundary line Lb, the flow continues to step S10. In step S10, it is determined whether or not the Z coordinate of the origin of vehicle Po is above the upper boundary line La. At this point, when the Z coordinate of the origin of vehicle Po is above the upper boundary line La, as shown in FIG. 23, the flow continues to step S11.

In step S11, the Y coordinate of the reference point Pb is set to a position equivalent to the average position of the upper boundary line La and the lower boundary line Lb plus the distance between the origin of vehicle Po and the upper boundary line La. Specifically, as shown in FIG. 23, a value equivalent to the Z coordinate of the midpoint Pm between the start point Ps and the end point Pe plus the distance Da between the origin of vehicle Po and the upper boundary line La in the Z axis direction is set to the Z coordinate of the reference point Pb. In FIG. 23, "Pb" indicates the position of the reference point when the Z coordinate of the origin of vehicle Po is between the upper boundary line La and the lower boundary line Lb.

The guidance picture is then displayed in step S9. Specifically, the travel mode picture 52 or the rough digging picture 53 is displayed. For example, when the rough digging picture 53 is displayed, the display object surface line 78 is displayed gradually moving downward in the side view 53b of the rough digging picture 53 as the main vehicle body 1 moves upward away from the upper boundary line La, as shown in FIGS. 24(a) to 24(c). The icon 75 of the hydraulic shovel 100 is fixedly displayed with respect to the up-and-down direction in the side view 53b of the rough digging picture 53 (cf. FIGS. 24(b), 24(c)). The side view 52b of the travel mode picture 52 is displayed in a manner similar to the side view 53b of the rough digging picture 53.

Figure 25:
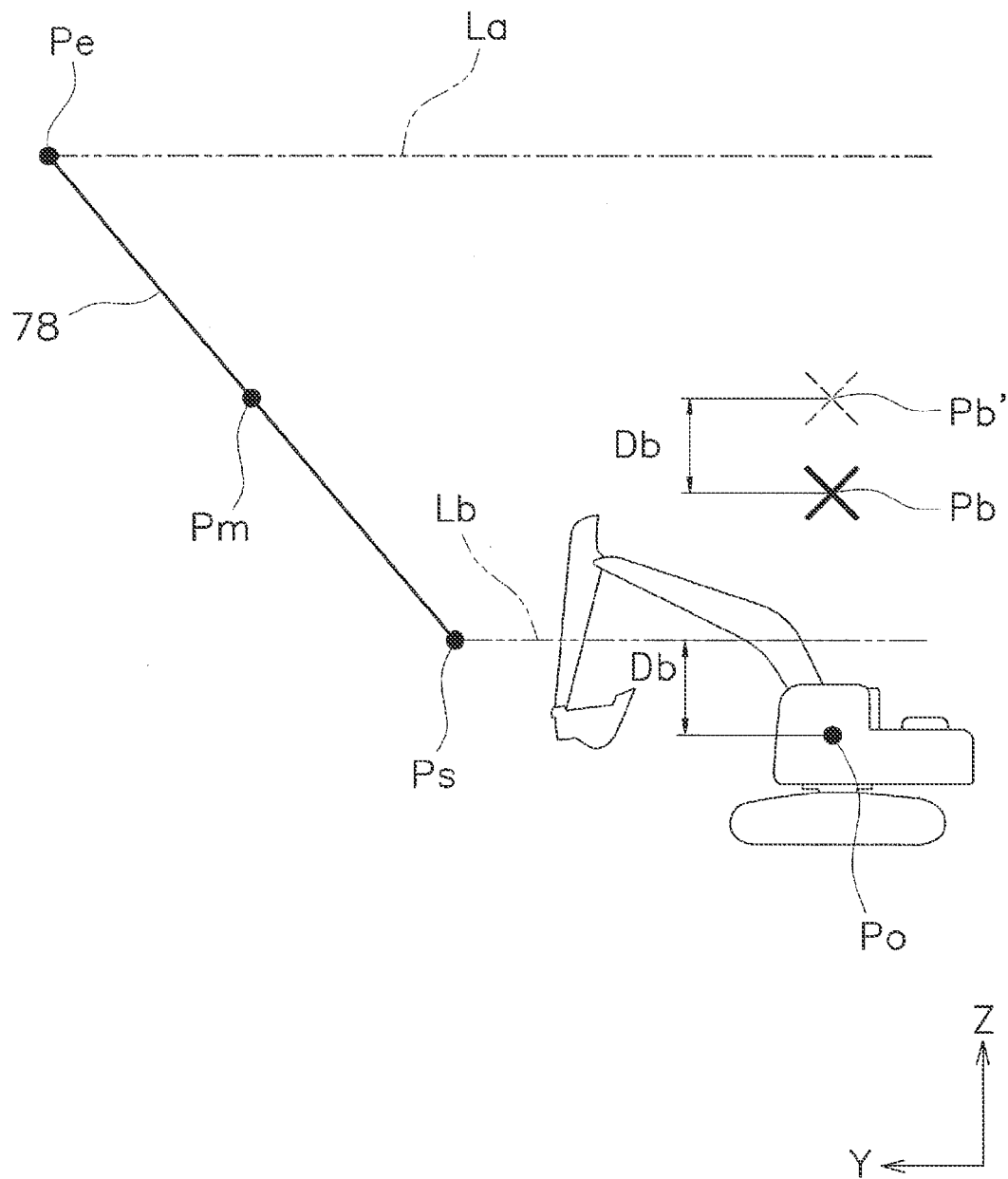
FIG. 25 shows a method of setting a reference point for a display range in a travel mode and a rough digging mode guidance picture.

When the Z coordinate of the origin of vehicle Po is determined not to be above the upper boundary line La in step S10, the flow continues to step S12. In other words, the flow continues to step S12 when the Z coordinate of the origin of vehicle Po is determined to be below the lower boundary line Lb, as shown in FIG. 25.

In step S12, the Z coordinate of the reference point Ph is set to a position equivalent to the average position of the upper boundary line La and the lower boundary line Lb minus the distance between the origin of vehicle Po and the lower boundary line Lb. In other words, a value equivalent to the Z coordinate of the midpoint Pm between the start point Ps and the end point Pe minus the distance Db between the origin of vehicle Po and the lower boundary line Lb in the Z axis direction is set to the Z coordinate of the reference point Pb, as shown in FIG. 25.

The guidance picture is then displayed in step S9. Specifically, the travel mode picture 52 or the rough digging picture 53 is displayed. For example, when the rough digging picture 53 is displayed, as shown in FIGS. 26(a) to 26(c), the display object surface line 78 is displayed gradually moving upward in the side view 53b of the rough digging picture 53 as the main vehicle body 1 moves downward away from the lower boundary line Lb. The icon 75 of the hydraulic shovel 100 is fixedly displayed with respect to the up-and-down direction in the side view 53b of the rough digging picture 53 (cf. FIGS. 26(b), 26(c)). The side view 52b of the travel mode screen 52 is displayed in a manner similar to the side view 53b of the rough digging picture 53.

Figure 22:
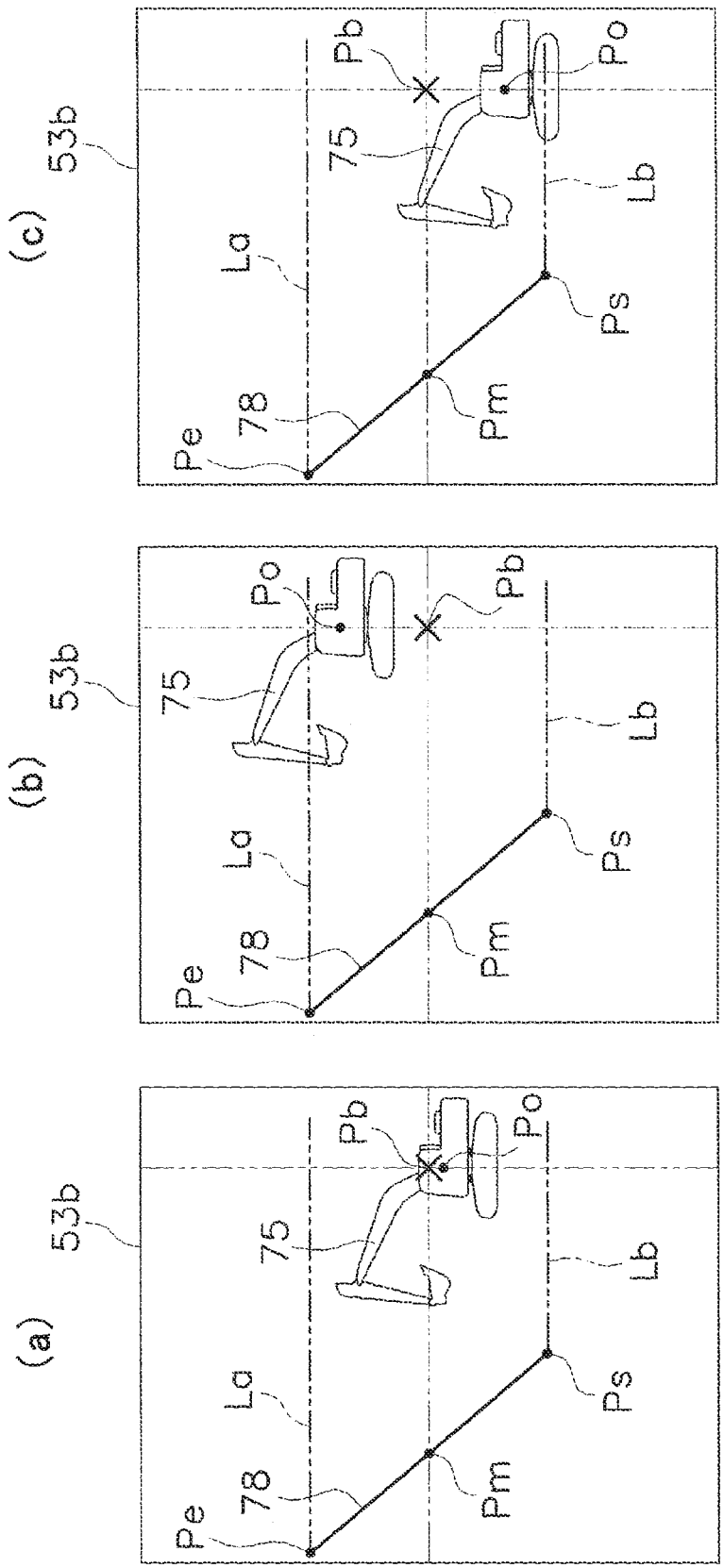
FIG. 22 is an illustration of changes of images in a travel mode and a rough digging mode guidance picture.
Figure 24:
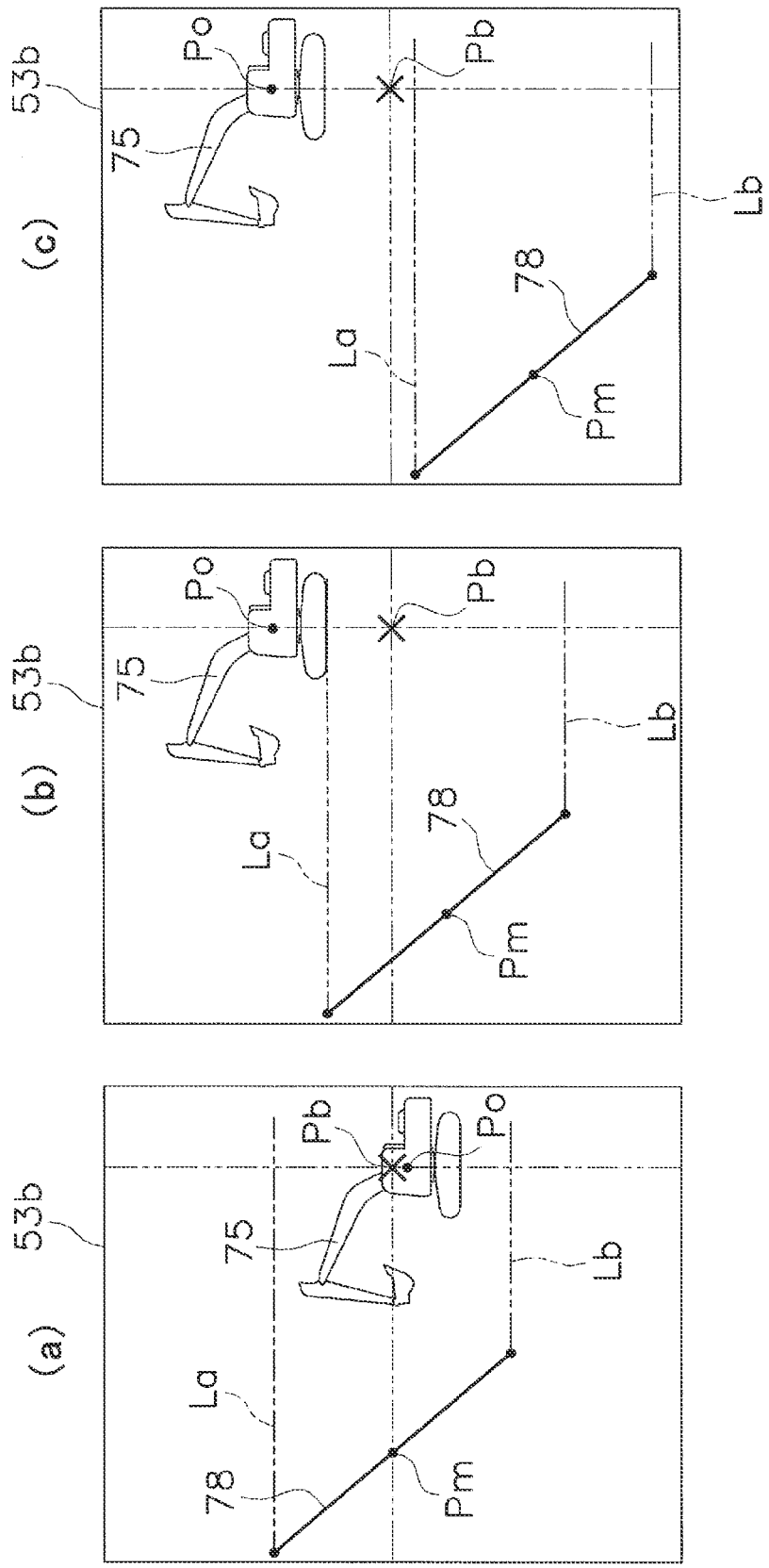
FIG. 24 is an illustration of changes of images in a travel mode and a rough digging mode guidance picture.
Figure 26:
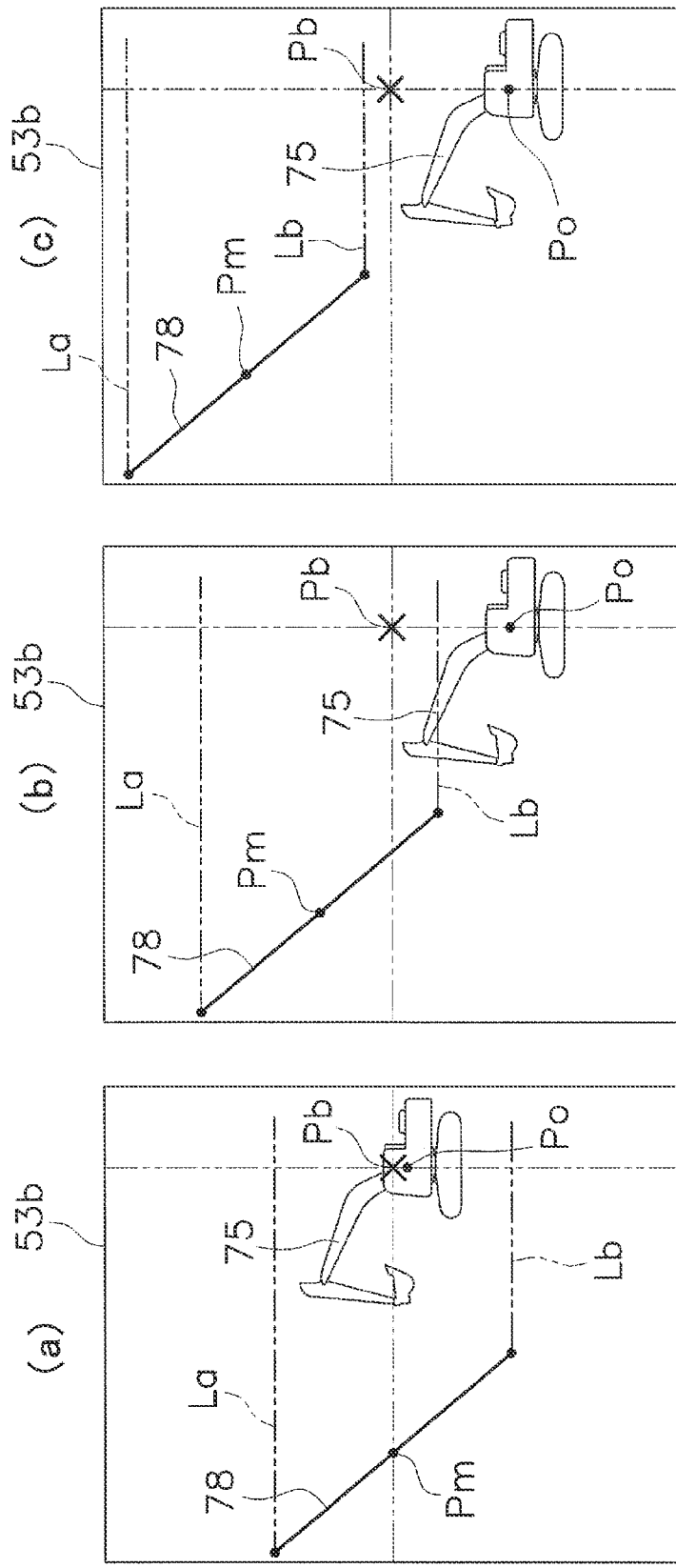
FIG. 26 is an illustration of changes of images in a travel mode and a rough digging mode guidance picture.
Figure 27:
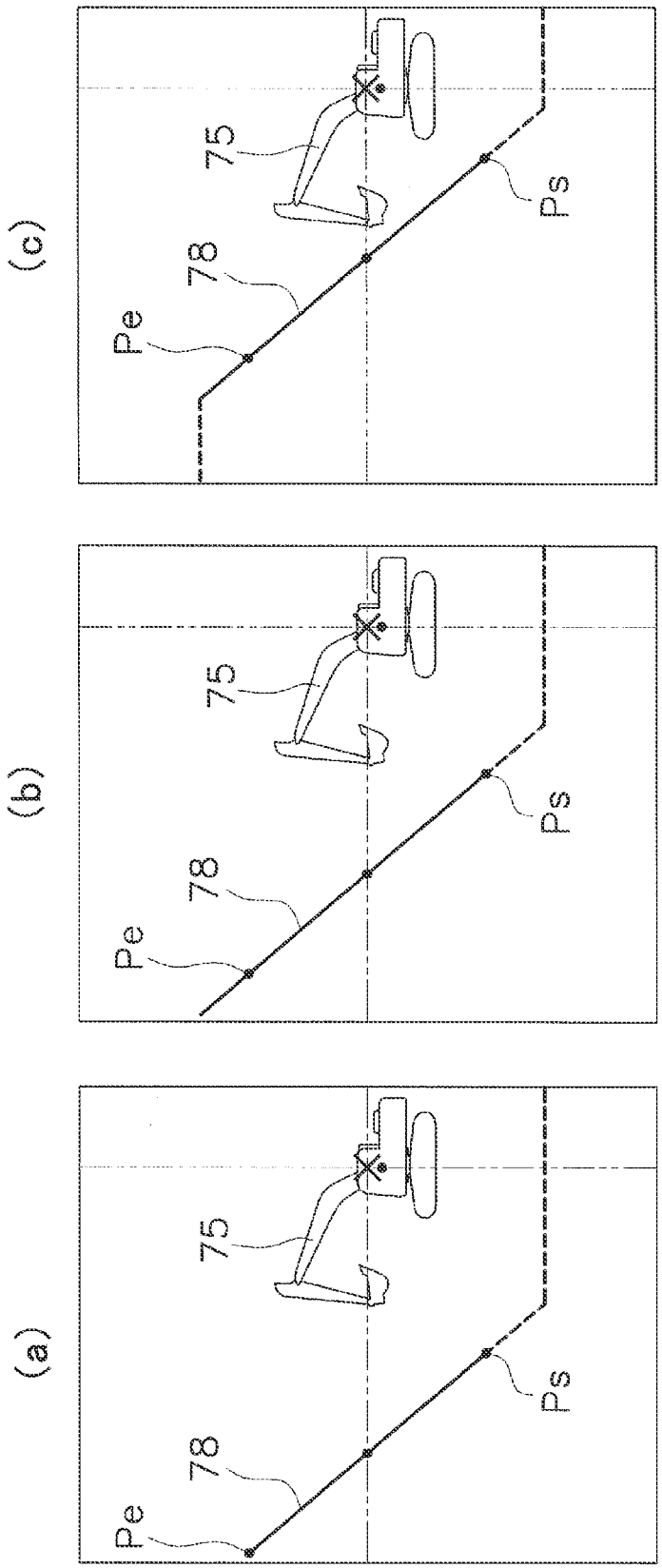
FIG. 27 is an illustration of changes of images in a travel mode and a rough digging mode guidance picture.

As described above, while the travel mode picture 52 or the rough digging picture 53 is being displayed, the Y coordinate of the reference point Pb is set to the Y coordinate of the origin of vehicle Po (cf. FIG. 16). Therefore, when the main vehicle body 1 moves in the Y axis direction, as shown in FIGS. 27(a) to 27(c), the icon 75 for the hydraulic shovel 100 is fixed in the guidance picture, and the display object surface line 78 is displayed moving in 4. Characteristics In the display system 28 according to the present embodiment, in the travel mode picture 52 and the rough digging picture 53, the Z coordinate of the reference point Pb of the display range 55 is fixed at the Z coordinate of the midpoint Pm between the upper boundary line La and the lower boundary line Lb when the origin of vehicle Po is positioned between the upper boundary line La and the lower boundary line Lb, as shown in FIG. 16. Thus, as shown in FIG. 22, the icon 75 for the hydraulic shovel 100 is displayed moving up or down without the display object surface line 78 moving in the guidance picture when the origin of vehicle Po moves up or down between the upper boundary line La and the lower boundary line Lb. When the origin of vehicle Po moves above the upper boundary line La, as shown in FIG. 24, the Z coordinate of the reference point Pb of the display range 55 is changed to a position above the Z coordinate of the midpoint Pm. The display object surface line 78 thereby moves downward in the guidance picture, and the display range 55 is displayed moving upward after the main vehicle body 1. When the origin of vehicle Po moves below the lower boundary line Lb, as shown in FIG. 26, the Z coordinate of the reference point Pb of the display range 55 is changed to a position below the Z coordinate of the midpoint Pm. The display object surface line 78 thereby moves upward in the guidance picture, and the display range 55 is displayed moving downward after the main vehicle body 1. This prevents the target surface line 92 and the main vehicle body 1 from being displayed excessively small. An operator is thus able to easily ascertain the positional relationship between the target surface 70 and the main vehicle body 1.

In addition, the Z coordinate of the reference point Pb of the display range 55 is changed to a position above the Z coordinate of the midpoint Pm according to the distance by which the current position of the origin of vehicle Po is higher than the upper boundary line La. The Z coordinate of the reference point Pb of the display range 55 is changed to a position below the Z coordinate of the midpoint Pm according to the distance by which the current position of the main vehicle body 1 is lower than the lower boundary line Lb. This enables the guidance picture to be scrolled smoothly.

5. Outer Embodiments

An embodiment of the present invention has been described above, but the present invention is not limited to this embodiment, and a variety of modifications are possible to the extent that they remain within the spirit of the invention. For example, the content of the guidance pictures is not limited to that described above, but may be modified as appropriate. Part or all of the functions of the display controller 39 may be executed by a computer disposed outside the hydraulic shovel 100. The target work object is not limited to the plane described above, but may be a point, line, or three-dimensional shape. The input unit 41 of the display input device 38 is not limited to a unit like a touch panel, but may also comprise an operating member such as a hard key or a switch. In the embodiment described above, the work machine 2 has a boom 6, an arm 7, and a bucket 8, but the configuration of the work machine 2 is not limited thereto.

In the embodiment described above, the angles of inclination of the boom 6, arm 7, and bucket 8 are detected by the first through third stroke sensors 16 to 18, but the means for detecting the angles of inclination is not limited thereto. For example, an angle sensor for detecting the angles of inclination of the boom 6, arm 7, and bucket 8 may be provided.

The coordinates of the reference point Pb in the fine digging picture 54 are not limited to the midpoint Pm between the start point Ps and the end point Pc, and may be set to another predetermined position. Similarly, in the travel mode picture 52 and the rough digging picture 53, the Z coordinate of the reference point Pb when the origin of vehicle Po is positioned between the upper boundary line La and the tower boundary line Lb is not limited to the Z coordinate of the midpoint Pin between the start point Ps and the end point Pe, and may be set to the Z coordinate of another position.

In the embodiment described above, the origin of vehicle Po indicating the current position of the main vehicle body 1 is set to the position of the bucket pin 15, but the origin of vehicle Po may also be set to another position on the vehicle body 1.

In the embodiment described above, the part of the target surface 70 between the start point Ps and the end point Pe is set to the display object surface line, but the entire target surface 70 may also be set to the display object surface line.

The pictures included in the various guidance pictures are not limited to those described above. For example, in the fine digging picture 54, a top view of the hydraulic shovel 100 may be displayed instead of the head-on view 54*a* described above.

The illustrated embodiment has the effect of allowing the positional relationship between the display object surface and the excavator displayed in the guidance picture to be easily ascertained, and is useful as a display system in an excavator and a method tier controlling the same.

The invention claimed is:

1. A display system in an excavator for displaying a guidance picture showing a current position of the excavator and a display object surface indicating a part of a target land shape of an object of excavation, the system comprising:
    a storage unit configured and arranged to store land shape data indicating a position of the display object surface;
    a position detector unit including a global positioning system configured and arranged to detect a current position of the excavator;
    a calculation unit configured to
        set a predetermined display range displayed as the guidance picture for the land shape data,
        calculate a position of an upper boundary line indicating a height of a top of a cross section of the display object surface and a position of a lower boundary line indicating a height of a bottom of a cross section of the display object surface based on the land shape data and the current position of the excavator,
        set a predetermined reference point indicating a predetermined position in the guidance picture to a predetermined height position between the upper boundary line and the lower boundary line when the current position of the excavator is between the upper boundary line and the lower boundary line,
        set the predetermined reference point above the predetermined height position when the current position of the excavator is above the upper boundary line, and
        set the predetermined reference point below the predetermined height position when the current position of the excavator is below the lower boundary line; and
    a display unit configured and arranged to display a guidance picture showing a cross section of the display object surface included in the predetermined display range as seen from a side of the excavator, and the current position of the excavator.

2. The display system in the excavator according to claim 1, wherein:
    the calculation unit is configured to set the predetermined reference point to a position higher than the predetermined height position by a distance between the current position of the excavator and the upper boundary line when the current position of the excavator is above the upper boundary line, and to set the predetermined reference point to a position lower than the predetermined height position by a distance between the current position of the excavator and the lower boundary line when the current position of the excavator is below the lower boundary line.

3. An excavator comprising the display system in the excavator according to claim 1.

4. A method for controlling a display system in an excavator for displaying a guidance picture showing a current position of the excavator and a display object surface indicating part of a target land shape of an object of excavation, the method comprising:
    detecting the current position of the excavator using a global positioning system;
    setting a predetermined display range displayed as the guidance picture for land shape data indicating a position of the display object surface;
    calculating a position of an upper boundary line indicating a height of a top of a cross section of the display object surface as seen from a side of the excavator and a position of a lower boundary line indicating a height of a bottom of a cross section of the display object surface as seen from the side, based on the land shape data and the current position of the excavator;

setting a predetermined reference point indicating a predetermined position in the guidance picture to a predetermined height position between the upper boundary line and the lower boundary line when the current position of the excavator is between the upper boundary line and the lower boundary line;

setting the predetermined reference point above the predetermined height position when the current position of the excavator is above the upper boundary line;

setting the predetermined reference point below the predetermined position when the current position of the excavator is below the lower boundary line; and displaying the guidance picture showing a cross section of the display object surface included in the predetermined display range as seen from the side, and the current position of the excavator.

5. The display system in the excavator according to claim 1, wherein the detected current position of the excavator is a position of a main vehicle body of the excavator.

6. The display system in the excavator according to claim 5, wherein the position of the main vehicle body is a position of the boom pin.

7. A display system in an excavator for displaying a guidance picture showing a current position of the excavator and a display object surface indicating a part of a target land shape of an object of excavation, the system comprising:

a storage unit configured and arranged to store land shape data indicating a position of the display object surface;

a position detector unit including a global positioning system configured and arranged to detect a current position of the excavator;

a calculation unit configured to set a predetermined display range displayed as the guidance picture for the land shape data, calculate a position of an upper boundary line indicating a height of a top of a cross section of the display object surface and a position of a lower boundary line indicating a height of a bottom of a cross section of the display object surface based on the land shape data and the current position of the excavator, set a predetermined reference point indicating a predetermined position in the guidance picture to a predetermined height position between the upper boundary line and the lower boundary line when the current position of the excavator is between the upper boundary line and the lower boundary line, set the predetermined reference point above the predetermined height position by a distance between the current position of the excavator and the upper boundary line when the current position of the excavator is above the upper boundary line when the current position of the excavator is above the upper boundary line, and set the predetermined reference point below the predetermined height position by a distance between the current position of the excavator and the lower boundary line when the current position of the excavator is below the lower boundary line; and a display unit configured and arranged to display a guidance picture showing a cross section of the display object surface included in the predetermined display range as seen from a side of the excavator, and the current position of the excavator.

* * * * *